US011150442B2

(12) United States Patent
Nakazawa

(10) Patent No.: US 11,150,442 B2
(45) Date of Patent: Oct. 19, 2021

(54) ZOOM LENS SYSTEM AND IMAGING DEVICE

(71) Applicant: PANASONIC INTELLECTUAL PROPERTY MANAGEMENT CO., LTD., Osaka (JP)

(72) Inventor: Genki Nakazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 203 days.

(21) Appl. No.: 16/440,071

(22) Filed: Jun. 13, 2019

(65) Prior Publication Data

US 2019/0293906 A1   Sep. 26, 2019

Related U.S. Application Data

(63) Continuation of application No. PCT/JP2018/038404, filed on Oct. 16, 2018.

(30) Foreign Application Priority Data

Oct. 27, 2017   (JP) .............................. JP2017-208352

(51) Int. Cl.
*G02B 9/62* (2006.01)
*G02B 13/02* (2006.01)
(Continued)

(52) U.S. Cl.
CPC .............. *G02B 9/62* (2013.01); *G02B 13/02* (2013.01); *G02B 13/18* (2013.01); *G02B 15/20* (2013.01);
(Continued)

(58) Field of Classification Search
CPC ...... G02B 9/62; G02B 27/0025; G02B 13/18; G02B 5/005; G02B 15/20; G02B 13/009; G02B 15/16; G02B 15/14; G02B 13/02
(Continued)

(56) References Cited

U.S. PATENT DOCUMENTS 5,691,851 A   11/1997 Nishio et al.
2009/0251781 A1   10/2009 Adachi et al.
(Continued)

FOREIGN PATENT DOCUMENTS

CN   107076972 A   8/2017
CN   107272172 A   10/2017
(Continued)

OTHER PUBLICATIONS

International Search Report and Written Opinion dated Dec. 11, 2018 in International Application No. PCT/JP2018/038404; with partial English translation.
(Continued)

*Primary Examiner* — Evelyn A Lester
(74) *Attorney, Agent, or Firm* — McDermott Will and Emery LLP

(57) ABSTRACT

A zoom lens system includes, in order from an object side to an image side: a first lens group having positive power; a second lens group having negative power; a third lens group having positive power; a fourth lens group having negative power; a fifth lens group having positive power; and a sixth lens group having power. During zooming from wide angle extremity to telephoto extremity, the distance between respective lens groups changes. The fifth lens group is composed of at most two lens elements, at least one of which is a concave meniscus lens element having a convex surface facing the object side.

9 Claims, 16 Drawing Sheets

(51) Int. Cl.
    *G02B 27/00*     (2006.01)
    *G02B 15/20*     (2006.01)
    *G02B 13/18*     (2006.01)
    *G03B 5/00*     (2021.01)
    *G02B 15/14*     (2006.01)
    *G02B 15/16*     (2006.01)
    *G02B 13/00*     (2006.01)
    *G02B 5/00*     (2006.01)

(52) U.S. Cl.
    CPC ........... *G02B 27/0025* (2013.01); *G03B 5/00* (2013.01); *G02B 5/005* (2013.01); *G02B 13/009* (2013.01); *G02B 15/14* (2013.01); *G02B 15/16* (2013.01)

(58) Field of Classification Search
    USPC ....... 359/676, 683–686, 713, 740, 756, 757, 359/766
    See application file for complete search history.

(56) References Cited

U.S. PATENT DOCUMENTS

| | | |
|---|---|---|
| 2010/0033836 A1 | 2/2010 | Ohtake |
| 2012/0188647 A1 | 7/2012 | Tanaka et al. |
| 2014/0022417 A1 | 1/2014 | Yokoyama et al. |
| 2015/0103211 A1 | 4/2015 | Bito et al. |
| 2015/0138401 A1 | 5/2015 | Fujisaki |
| 2015/0237242 A1 | 8/2015 | Imaoka |
| 2017/0059834 A1 | 3/2017 | Fujisaki |
| 2017/0254993 A1 | 9/2017 | Suzuki et al. |
| 2017/0293121 A1 | 10/2017 | Kawamura |
| 2018/0045929 A1* | 2/2018 | Takemoto ............ G02B 27/646 |

FOREIGN PATENT DOCUMENTS

| | | |
|---|---|---|
| JP | H04-158325 A | 6/1992 |
| JP | H07-077656 A | 3/1995 |
| JP | 2009-265652 A | 11/2009 |
| JP | 2010-039271 A | 2/2010 |
| JP | 2010-271362 A | 12/2010 |
| JP | 2012-155087 A | 8/2012 |
| JP | 2014-021313 A | 2/2014 |
| JP | 2014-228734 A | 12/2014 |
| JP | 2016-065912 A | 4/2016 |
| JP | 2016-126278 A | 7/2016 |
| JP | 2016-166972 A | 9/2016 |
| JP | 2016-173438 A | 9/2016 |
| JP | 2017-068116 A | 4/2017 |
| JP | 2018-036364 A | 3/2018 |
| WO | 2014/006653 A1 | 1/2014 |
| WO | 2015/045297 A1 | 4/2015 |

OTHER PUBLICATIONS

Chinese Office Action and Search Report dated Nov. 20, 2020 issued in corresponding Chinese Patent Application No. 201880004894.8; with English translation of the Search Report.

Extended European Search Report dated Nov. 23, 2020 issued in corresponding European Patent Application No. 18871395.2.

* cited by examiner

ZOOM LENS SYSTEM AND IMAGING DEVICE

CROSS REFERENCE TO RELATED APPLICATIONS

This application is a U.S. continuation application of PCT International Patent Application Number PCT/JP2018/038404 filed on Oct. 16, 2018, claiming the benefit of priority of Japanese Patent Application Number 2017-208352 filed on Oct. 27, 2017, the entire contents of which are hereby incorporated by reference.

BACKGROUND

1. Technical Field

The present disclosure relates to a zoom lens system that is small and achieves excellent optical performance over the entire zoom range and to an imaging device using the zoom lens system.

2. Description of the Related Art

For cameras having an imaging element which performs photoelectric conversion, such as digital still cameras or digital video cameras, and, particularly in recent years, compact cameras with integrated imaging element, there has been a demand for high image quality through enlargement of the imaging element. For example, there have been proposed various types of zoom lens systems having a six-group configuration in which a first lens group having positive power; a second lens group having negative power; a third lens group having positive power; a fourth lens group having negative power; a fifth lens group having positive power; and a subsequent group following thereafter, are arranged in order from an object side to an image side.

Japanese Unexamined Patent Application Publication No. 2012-155087 and Japanese Unexamined Patent Application Publication No. 2016-173438 disclose zoom lens systems having a six-group configuration that achieves a high zoom ratio and performs zooming by changing the distances between the respective groups.

SUMMARY

The present disclosure has an object to provide a zoom lens system that is small and achieves excellent optical performance over the entire zoom range and to an imaging device using the zoom lens system.

A zoom lens system according to the present disclosure includes, in order from an object side to an image side: a first lens group having positive power; a second lens group having negative power; a third lens group having positive power; a fourth lens group having negative power; a fifth lens group having positive power; and a sixth lens group having power, wherein during zooming from a wide angle extremity to a telephoto extremity, distances between lens groups change, the fifth lens group includes at most two lens elements, at least one of which is a convex meniscus lens having a concave surface on the object side, and the following condition (4) is satisfied: $10.2 < fT/fW \ldots (4)$. Here, $fT$ denotes a focal length at the telephoto extremity, and $fW$ denotes a focal length at the wide angle extremity.

The present disclosure can provide a zoom lens system that is small and achieves excellent optical performance over the entire zoom range and to an imaging device using the zoom lens system.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF EMBODIMENTS

Figure 1:
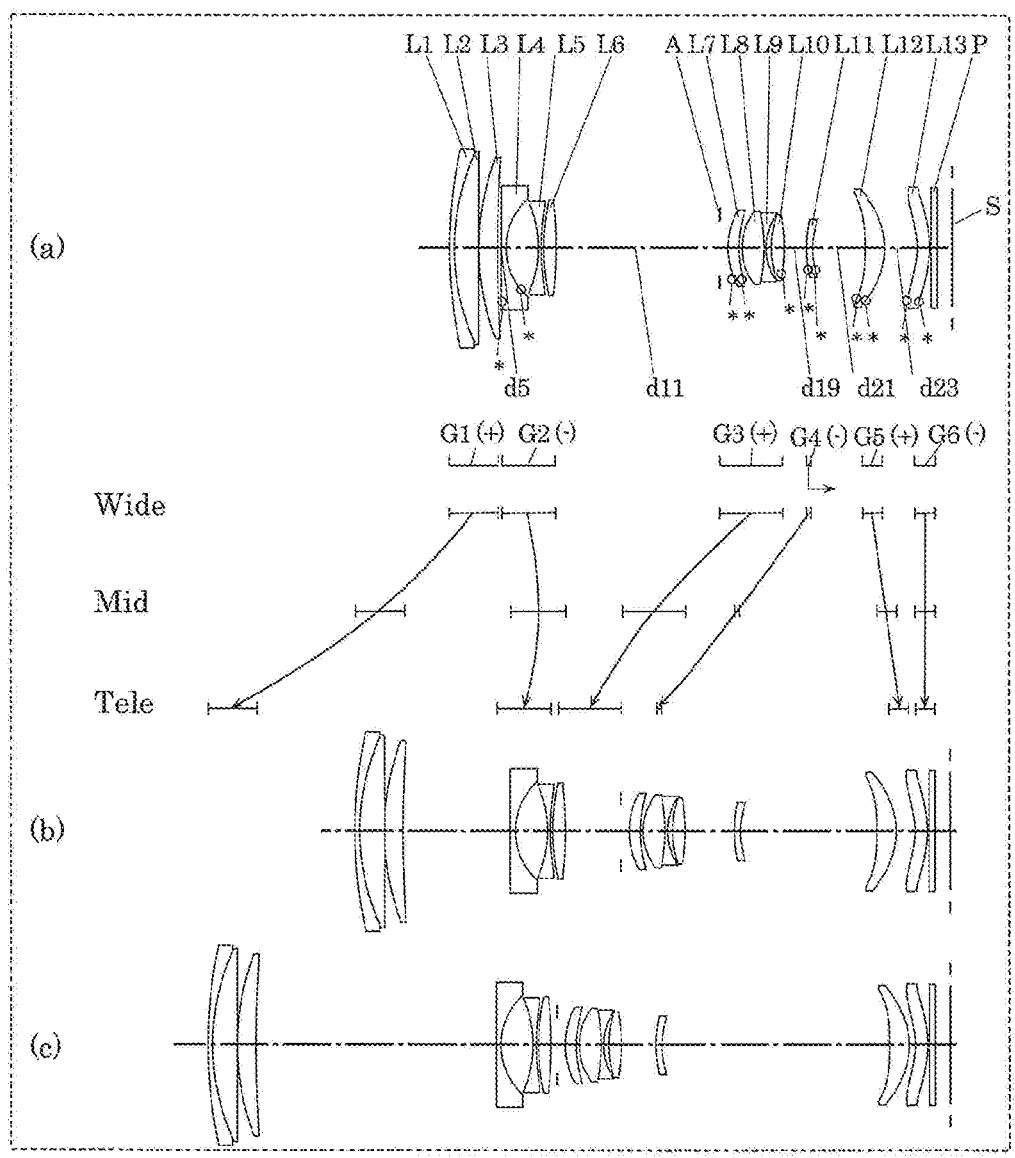
FIG. 1 is a lens arrangement diagram illustrating an infinity focusing state of an imaging optical system according to Embodiment 1 (Numerical Implementation Example 1)
Figure 2:
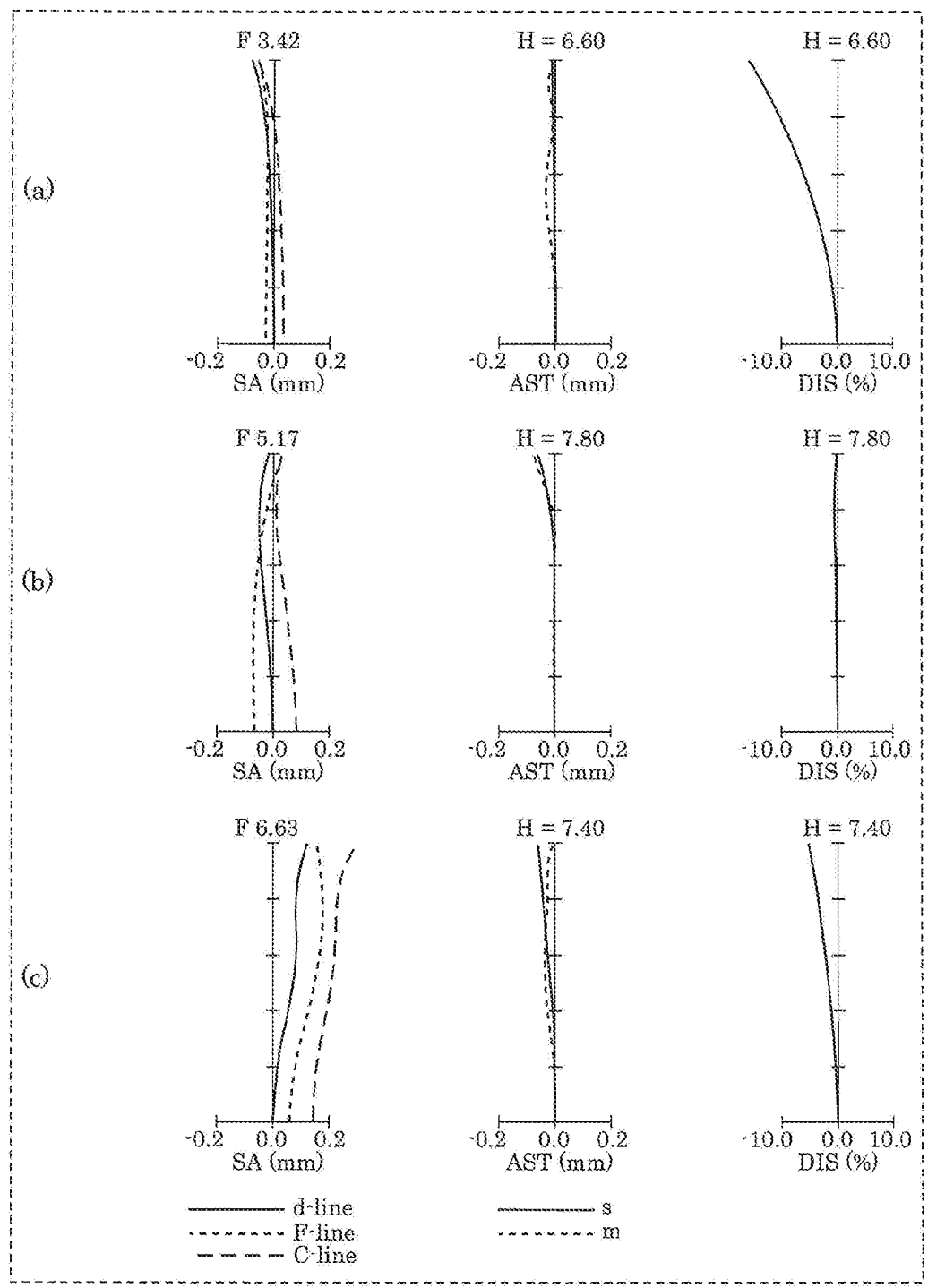
FIG. 2 illustrates longitudinal aberration in the infinity focusing state of the imaging optical system according to Numerical Implementation Example 1.
Figure 3:
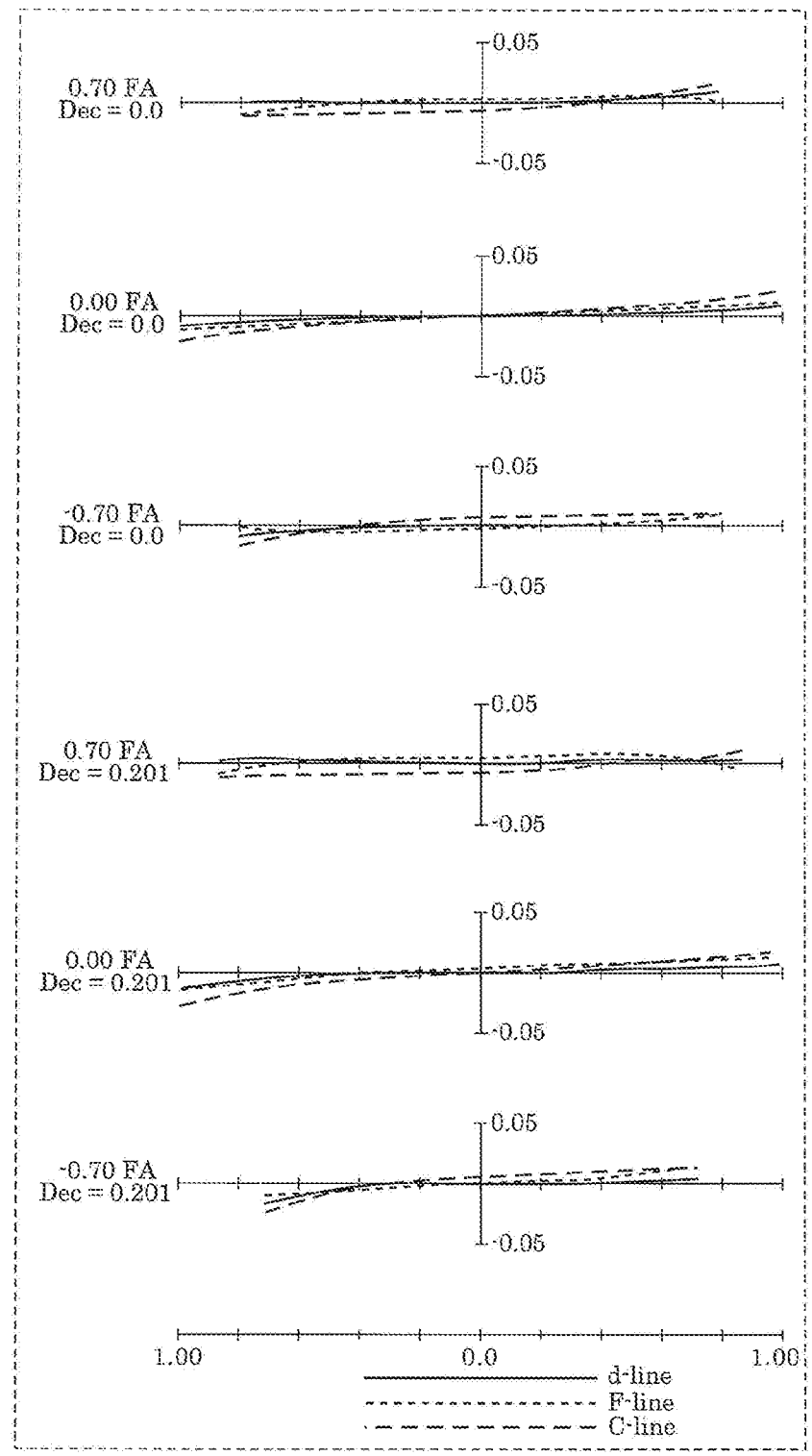
FIG. 3 illustrates lateral aberration in a basic state in which image blur correction is not carried out and an image blur corrected state, at the telephoto extremity of the imaging optical system according to Numerical Implementation Example 1.

Hereinafter, exemplary embodiments are described in detail with reference to the drawings as necessary. However, there are instances where overly detailed description is omitted. For example, there are instances where detailed description of well-known matter and overlapping description of substantially identical elements are omitted. This is to avoid making the subsequent description verbose, and thus facilitate understanding by a person having ordinary skill in the art.

It should be noted the accompanying drawings and the subsequent description are provided by the inventor in order for a person having ordinary skill in the art to sufficiently understand the present disclosure, and are thus not intended to limit the subject matter recited in the claims.

Embodiments 1 to 5

FIG. 1, FIG. 4, FIG. 7, FIG. 10, and FIG. 13 are lens arrangement diagrams of imaging optical systems according to Embodiments 1 to 5, respectively, and each illustrates the imaging optical system in the infinity focusing state.

In each of FIG. 1, FIG. 4, FIG. 7, FIG. 10, and FIG. 13, the portion shown in (a) illustrates a lens configuration at a wide angle extremity (shortest focal length state: focal length fW), the portion shown in (b) illustrates a lens configuration at a middle position (middle focal length state: foal length fM=√(fW*fT), and the portion shown in (c) illustrates a lens configuration a lens configuration at the telephoto extremity (longest focal length state: focal length fT). In the portion shown in (a), the portion shown in (b), and the portion shown in (c), the longitudinal aberrations coincide.

Furthermore, in each of FIG. 1, FIG. 4, FIG. 7, FIG. 10, and FIG. 13, the curved arrows provided between the portion shown in (a) and the portion shown in (b), are lines obtained by connecting the positions of the lens groups in the respective states of, in order from the top, the wide angle extremity (Wide), the middle position (Mid), and telephoto extremity (Tele). The wide angle extremity and middle position, and the middle position and telephoto extremity are simply connected by curved lines only, which is different from the actual movement of the respective lens groups.

In addition, in FIG. 1, FIG. 4, FIG. 7, FIG. 10, and FIG. 13, the arrows provided to the lens groups represent the focusing from the infinity focusing state to the proximity focusing state. Moreover, in each of FIG. 1, FIG. 4, FIG. 7, FIG. 10, and FIG. 13, the reference signs of the respective lens groups are denoted below the positions of the respective lens groups in the portion shown in (a), and thus, for the sake of convenience, arrows representing the focusing are provided below the reference signs of the respective lens groups. However, the direction in which each lens group moves during focusing in the respective zooming states is specifically described later for each of the embodiments.

It should be noted that, in FIG. 1, FIG. 4, FIG. 7, FIG. 10, and FIG. 13, an asterisk (*) affixed to a particular surface denotes that the surface is an aspheric surface. Moreover, in FIG. 1, FIG. 4, FIG. 7, FIG. 10, and FIG. 13, the (+) sign or (−) sign affixed to the reference sign of each lens group corresponds to the sign indicating the power of the lens group. Furthermore, in FIG. 1, FIG. 4, FIG. 7, FIG. 10, and FIG. 13, the straight lines at the right-most side represent the position of imaging surface S (object-side surface of the imaging element).

Embodiment 1

FIG. 1 illustrates an imaging optical system according to Embodiment 1.

A zoom lens system includes, in order from the object side to the image side, first lens group G1 having positive power, second lens group G2 having negative power, third lens group G3 having positive power, fourth lens group G4 having negative power, fifth lens group G5 having positive power, sixth lens group G6 having negative power, and parallel plate P.

The zoom lens system forms an image at the position of imaging surface S.

First lens group G1 includes, in order from the object side to the image side, first lens element L1 having negative power, second lens element L2 having positive power, and third lens element L3 having positive power. First lens element L1 and second lens element L2 are cemented lenses bonded together by an adhesive, etc.

Second lens group G2 includes, in order from the object side to the image side, fourth lens element L4 having negative power, fifth lens element L5 having negative power, and sixth lens element L6 having positive power.

Third lens group G3 includes, in order from the object side to the image side, aperture diaphragm A, seventh lens element L7 having positive power, eighth lens element L8 having positive power, ninth lens element L9 having negative power, and tenth lens element L10 having positive power. Eighth lens element L8 and ninth lens element L9 are cemented lenses bonded together by an adhesive, etc.

Fourth lens group G4 is a single lens and includes eleventh lens element L11 having negative power.

Fifth lens group G5 is a single lens and includes twelfth lens element L12 having positive power.

Sixth lens group G6 is a single lens and includes thirteenth lens element L13 having negative power.

Next, each lens element will be described.

The lens elements in first lens group G1 will be described. First lens element L1 is a concave meniscus lens whose convex surface is on the object side. Second lens element L2 is a convex meniscus lens whose convex surface is on the object side. Third lens element L3 is a convex meniscus lens whose convex surface is on the object side.

The lens elements in second lens group G2 will be described. Fourth lens element L4 is a concave meniscus lens whose convex surface is on the object side, and has an aspheric shape on the object side and the image side. Fifth lens element L5 is a biconcave lens. Sixth lens element L6 is a biconvex lens.

The lens elements in third lens group G3 will be described. Seventh lens element L7 is a convex meniscus lens whose convex surface is on the object side, and has an aspheric shape on the object side and the image side. Eighth lens element L8 is a biconvex lens. Ninth lens element L9 is a biconcave lens. Tenth lens element L10 is a biconvex lens and has an aspheric shape on the image side.

The lens element in fourth lens group G4 will be described. Eleventh lens element L11 is a concave meniscus lens whose convex surface is on the object side, and has an aspheric shape on the object side and the image side.

The lens element in fifth lens group G5 will be described. Twelfth lens element L12 is a convex meniscus lens whose concave surface is on the object side, and has an aspheric shape on the object side and the image side.

The lens element in sixth lens group G6 will be described. Thirteenth lens element L13 is a concave meniscus lens whose concave surface is on the object side, and has an aspheric shape on the object side and the image side.

In the zoom lens system according to Embodiment 1, when zooming from the wide angle extremity to the telephoto extremity during imaging, first lens group G1, third lens group G3, and fourth lens group G4 move toward the object side, second lens group G2 moves toward the image side plotting a convex trajectory, and fifth lens group G5 moves toward the object side. Sixth lens group G6 is fixed when zooming from the wide angle extremity to the telephoto extremity during imaging. Specifically, when zooming, the respective lens groups move along the optical axis such that the distance between first lens group G1 and second lens group G2 increases, the distance between second lens group G2 and third lens group G3 decreases, the distance between third lens group G3 and fourth lens group G4 increases, the distance between fourth lens group G4 and fifth lens group G5 increases, and the distance between fifth lens group G5 and sixth lens group G6 decreases.

In the zoom lens system according to Embodiment 1, when focusing from an object at infinity to a close object, fourth lens group G4 moves along the optical axis toward the image side.

It should be noted that all the lens elements (image blur correction lens elements) in third lens group G3 move in a direction perpendicular to the optical axis in order to optically correct image blur. The image blur correction lens elements enable the zoom lens system to correct image point movement caused by vibration throughout the system. Specifically, the zoom lens system is capable of optically correcting image blur caused by hand shaking, vibration, etc.

Embodiment 2

Figure 4:
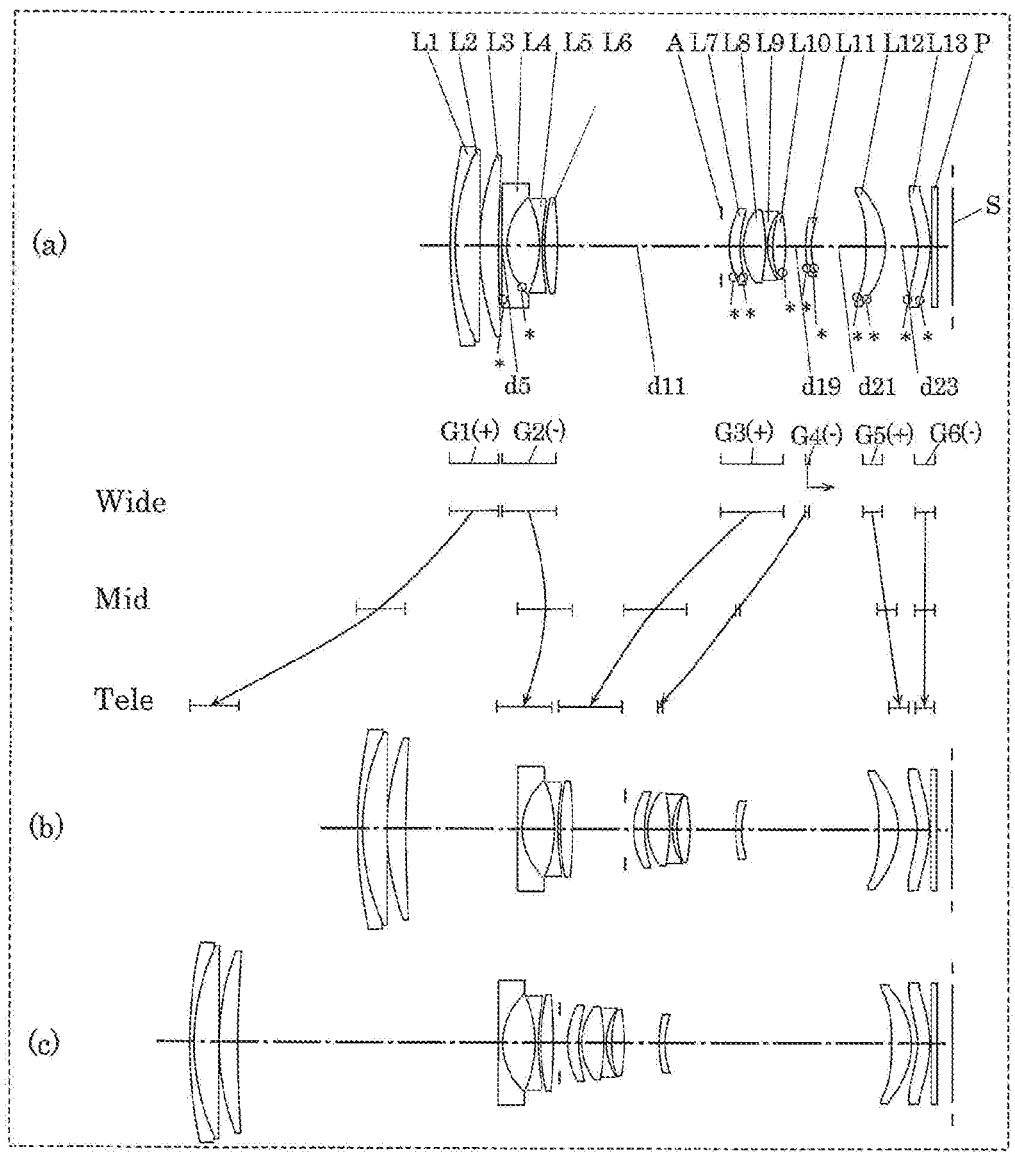
FIG. 4 is a lens arrangement diagram illustrating an infinity focusing state of an imaging optical system according to Embodiment 2 (Numerical Implementation Example 2)
Figure 5:
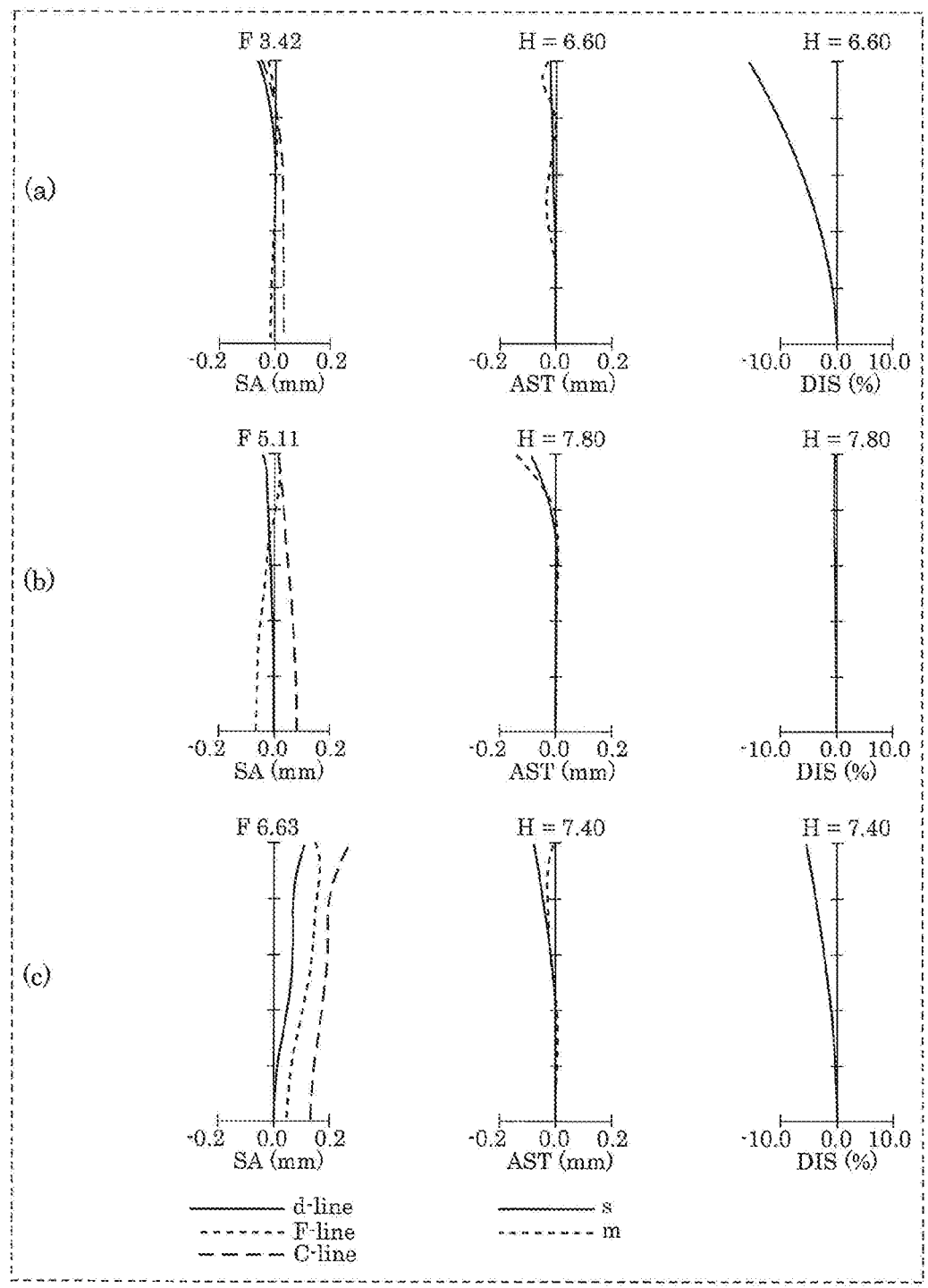
FIG. 5 illustrates longitudinal aberration in the infinity focusing state of the imaging optical system according to Numerical Implementation Example 2.
Figure 6:
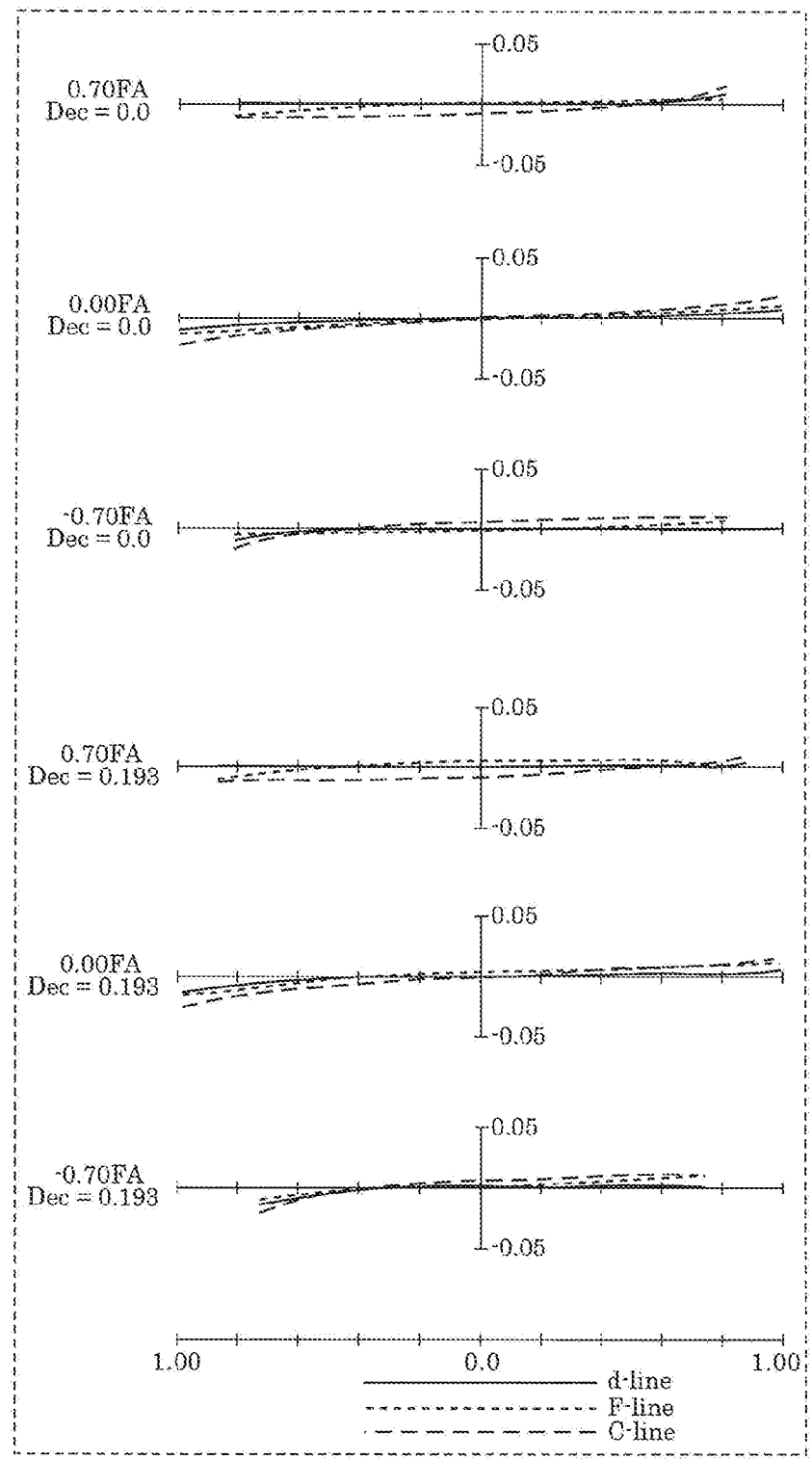
FIG. 6 illustrates lateral aberration in a basic state in which image blur correction is not carried out and an image blur corrected state, at the telephoto extremity of the imaging optical system according to Numerical Implementation Example 2.

FIG. 4 illustrates an imaging optical system according to Embodiment 2.

A zoom lens system includes, in order from the object side to the image side, first lens group G1 having positive power, second lens group G2 having negative power, third lens group G3 having positive power, fourth lens group G4 having negative power, fifth lens group G5 having positive power, sixth lens group G6 having negative power, and parallel plate P.

The zoom lens system forms an image at the position of imaging surface S.

First lens group G1 includes, in order from the object side to the image side, first lens element L1 having negative power, second lens element L2 having positive power, and third lens element L3 having positive power. First lens element L1 and second lens element L2 are cemented lenses bonded together by an adhesive, etc.

Second lens group G2 includes, in order from the object side to the image side, fourth lens element L4 having negative power, fifth lens element L5 having negative power, and sixth lens element L6 having positive power.

Third lens group G3 includes, in order from the object side to the image side, aperture diaphragm A, seventh lens element L7 having positive power, eighth lens element L8 having positive power, ninth lens element L9 having negative power, and tenth lens element L10 having positive power. Eighth lens element L8 and ninth lens element L9 are cemented lenses bonded together by an adhesive, etc.

Fourth lens group G4 is a single lens and includes eleventh lens element L11 having negative power.

Fifth lens group G5 is a single lens and includes twelfth lens element L12 having positive power.

Sixth lens group G6 is a single lens and includes thirteenth lens element L13 having negative power.

Next, each lens element will be described.

The lens elements in first lens group G1 will be described. First lens element L1 is a concave meniscus lens whose convex surface is on the object side. Second lens element L2 is a biconvex lens. Third lens element L3 is a convex meniscus lens whose convex surface is on the object side.

The lens elements in second lens group G2 will be described. Fourth lens element L4 is a concave meniscus lens whose convex surface is on the object side, and has an aspheric shape on the object side and the image side. Fifth lens element L5 is a biconvex lens and has an aspheric shape on the object side and the image side. Sixth lens element L6 is a biconvex lens.

The lens elements in third lens group G3 will be described. Seventh lens element L7 is a convex meniscus lens whose convex surface is on the object side, and has an aspheric shape on the object side and the image side. Eighth lens element L8 is a biconvex lens. Ninth lens element L9 is a biconcave lens. Tenth lens element L10 is a biconvex lens and has an aspheric shape on the image side.

The lens element in fourth lens group G4 will be described. Eleventh lens element L11 is a concave meniscus lens whose convex surface is on the object side, and has an aspheric shape on the object side and the image side.

The lens element in fifth lens group G5 will be described. Twelfth lens element L12 is a convex meniscus lens whose concave surface is on the object side, and has an aspheric shape on the object side and the image side.

The lens element in sixth lens group G6 will be described. Thirteenth lens element L13 is a concave meniscus lens whose concave surface is on the object side, and has an aspheric shape on the object side and the image side.

In the zoom lens system according to Embodiment 2, when zooming from the wide angle extremity to the telephoto extremity during imaging, first lens group G1, third lens group G3, and fourth lens group G4 move toward the object side, second lens group G2 moves toward the image side plotting a convex trajectory, and fifth lens group G5 moves toward the object side. Sixth lens group G6 is fixed when zooming from the wide angle extremity to the telephoto extremity during imaging. Specifically, when zooming, the respective lens groups move along the optical axis such that the distance between first lens group G1 and second lens group G2 increases, the distance between second lens group G2 and third lens group G3 decreases, the distance between third lens group G3 and fourth lens group G4 increases, the distance between fourth lens group G4 and fifth lens group G5 increases, and the distance between fifth lens group G5 and sixth lens group G6 decreases.

In the zoom lens system according to Embodiment 2, when focusing from an object at infinity to a close object, fourth lens group G4 moves along the optical axis toward the image side.

It should be noted that all the lens elements (image blur correction lens elements) in third lens group G3 move in a direction perpendicular to the optical axis in order to optically correct image blur. The image blur correction lens elements enable the zoom lens system to correct image point movement caused by vibration throughout the system. Specifically, the zoom lens system is capable of optically correcting image blur caused by hand shaking, vibration, etc.

Embodiment 3

Figure 7:
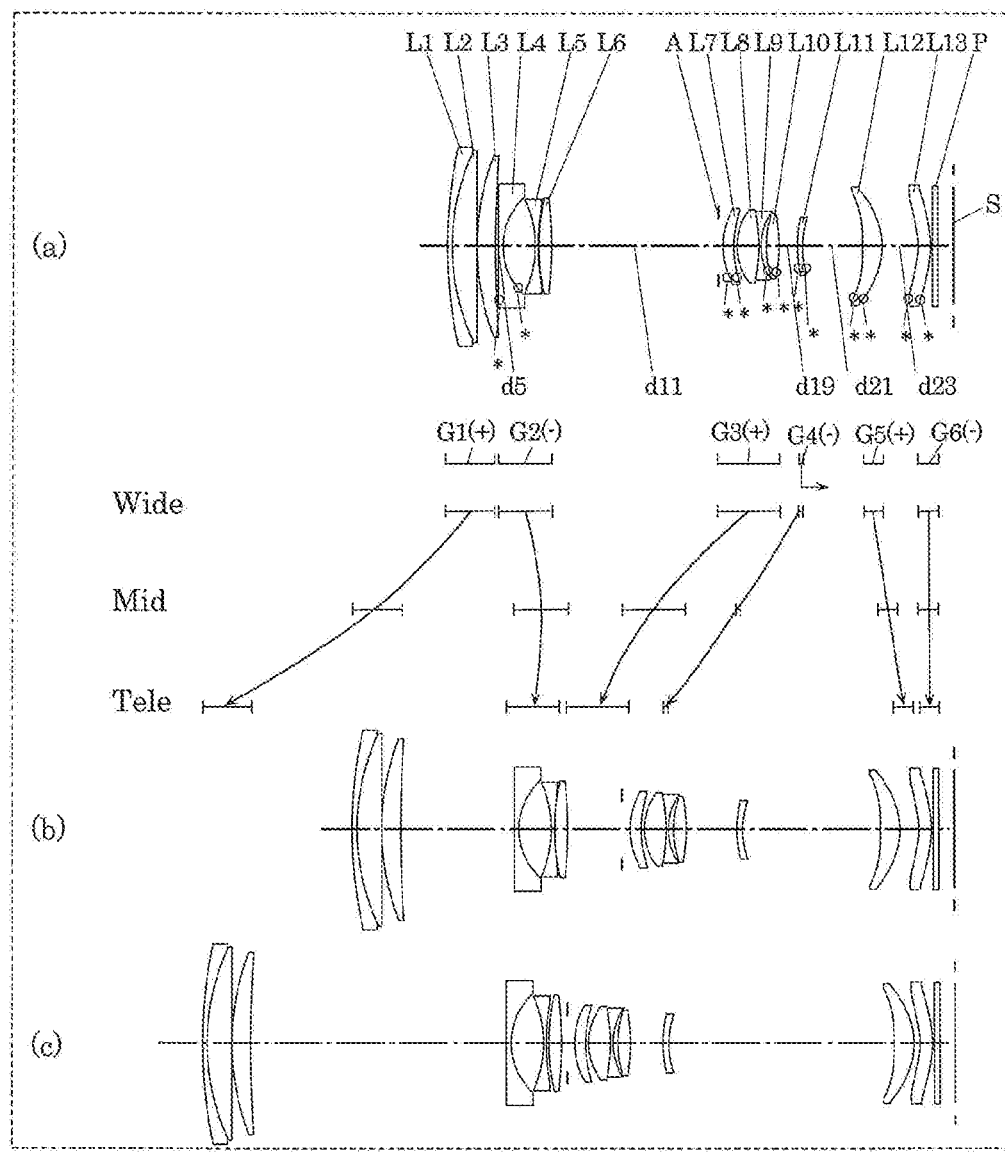
FIG. 7 is a lens arrangement diagram illustrating an infinity focusing state of an imaging optical system according to Embodiment 3 (Numerical Implementation Example 3)
Figure 8:
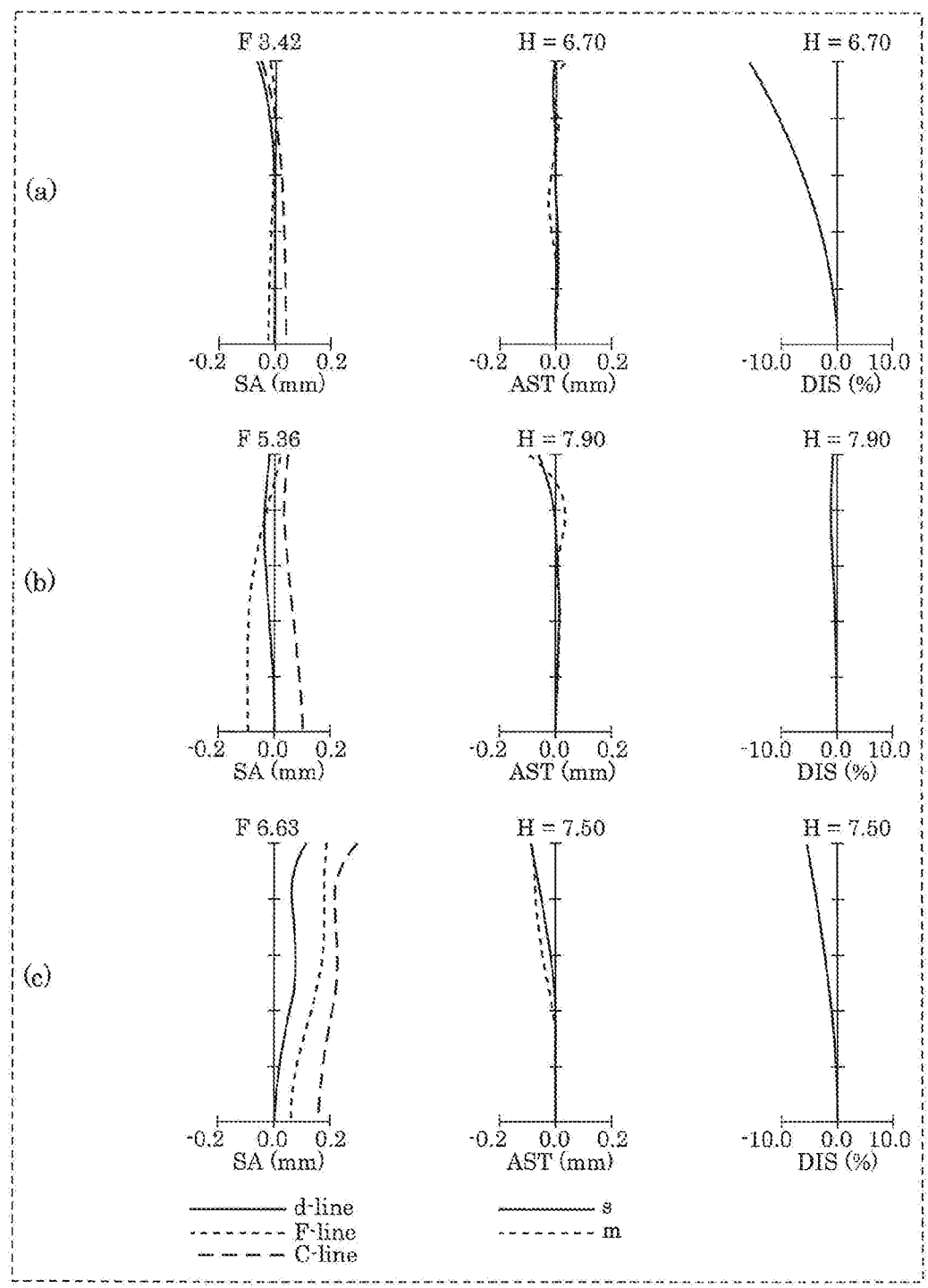
FIG. 8 illustrates longitudinal aberration in the infinity focusing state of the imaging optical system according to Numerical Implementation Example 3.
Figure 9:
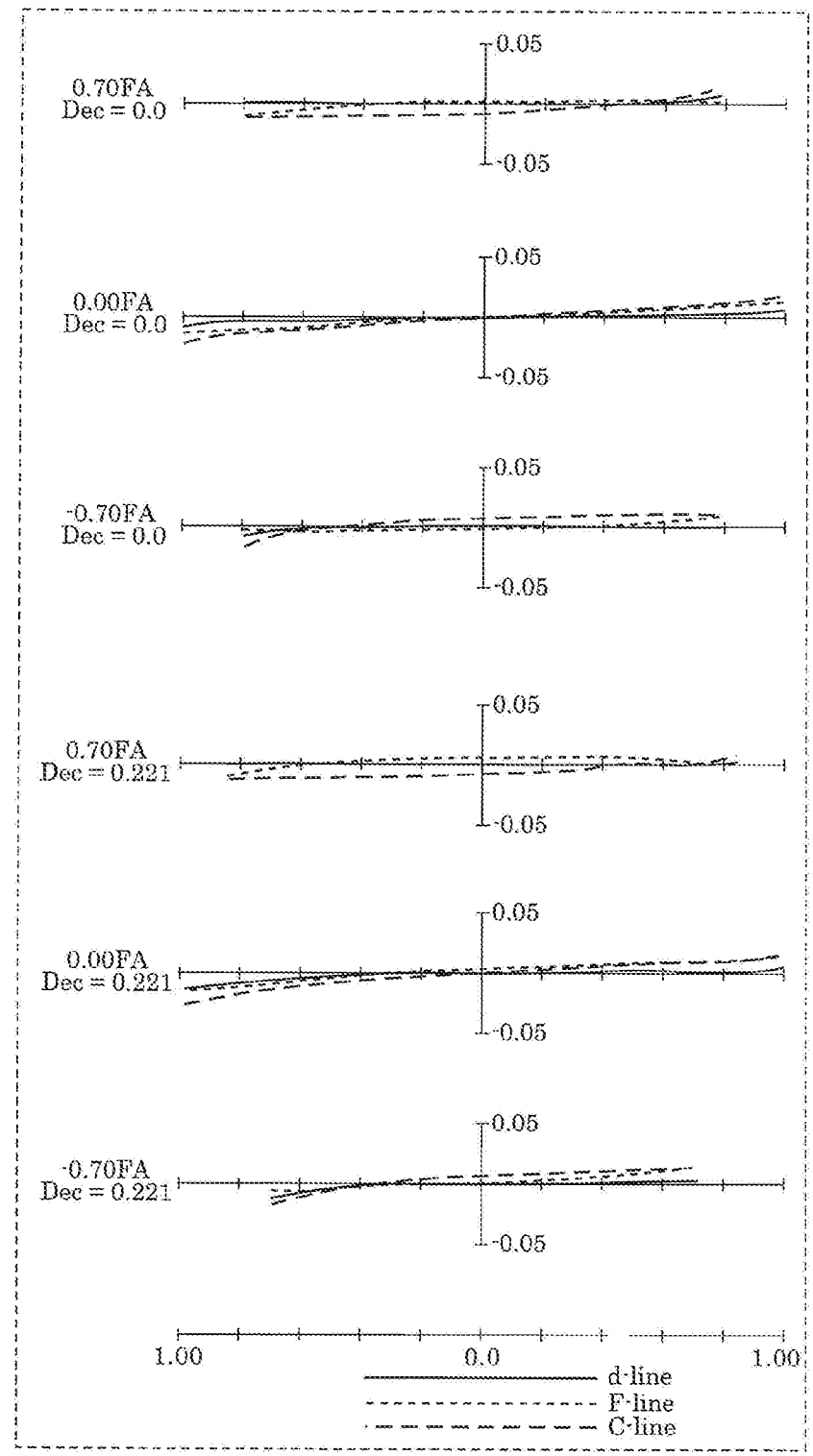
FIG. 9 illustrates lateral aberration in a basic state in which image blur correction is not carried out and an image blur corrected state, at the telephoto extremity of the imaging optical system according to Numerical Implementation Example 3.

FIG. 7 illustrates an imaging optical system according to Embodiment 3.

A zoom lens system includes, in order from the object side to the image side, first lens group G1 having positive power, second lens group G2 having negative power, third lens group G3 having positive power, fourth lens group G4 having negative power, fifth lens group G5 having positive power, sixth lens group G6 having negative power, and parallel plate P.

The zoom lens system forms an image at the position of imaging surface S.

First lens group G1 includes, in order from the object side to the image side, first lens element L1 having negative power, second lens element L2 having positive power, and third lens element L3 having positive power. First lens element L1 and second lens element L2 are cemented lenses bonded together by an adhesive, etc.

Second lens group G2 includes, in order from the object side to the image side, fourth lens element L4 having negative power, fifth lens element L5 having negative power, and sixth lens element L6 having positive power.

Third lens group G3 includes, in order from the object side to the image side, aperture diaphragm A, seventh lens element L7 having positive power, eighth lens element L8 having positive power, ninth lens element L9 having negative power, and tenth lens element L10 having positive power. Eighth lens element L8 and ninth lens element L9 are cemented lenses bonded together by an adhesive, etc.

Fourth lens group G4 is a single lens and includes eleventh lens element L11 having negative power.

Fifth lens group G5 is a single lens and includes twelfth lens element L12 having positive power.

Sixth lens group G6 is a single lens and includes thirteenth lens element L13 having negative power.

Next, each lens element will be described.

The lens elements in first lens group G1 will be described. First lens element L1 is a concave meniscus lens whose convex surface is on the object side. Second lens element L2 is a biconvex lens. Third lens element L3 is a convex meniscus lens whose convex surface is on the object side.

The lens elements in second lens group G2 will be described. Fourth lens element L4 is a concave meniscus lens whose convex surface is on the object side, and has an aspheric shape on the object side and the image side. Fifth lens element L5 is a biconcave lens. Sixth lens element L6 is a biconvex lens.

The lens elements in third lens group G3 will be described. Seventh lens element L7 is a convex meniscus lens whose convex surface is on the object side, and has an aspheric shape on the object side and the image side. Eighth lens element L8 is a biconvex lens. Ninth lens element L9 is a biconcave lens. Tenth lens element L10 is a biconvex lens and has an aspheric shape on the object side and the image side.

The lens element in fourth lens group G4 will be described. Eleventh lens element L11 is a concave meniscus lens whose convex surface is on the object side, and has an aspheric shape on the object side and the image side.

The lens element in fifth lens group G5 will be described. Twelfth lens element L12 is a convex meniscus lens whose concave surface is on the object side, and has an aspheric shape on the object side and the image side.

The lens element in sixth lens group G6 will be described. Thirteenth lens element L13 is a concave meniscus lens whose concave surface is on the object side, and has an aspheric shape on the object side and the image side.

In the zoom lens system according to Embodiment 3, when zooming from the wide angle extremity to the telephoto extremity during imaging, first lens group G1, third lens group G3, and fourth lens group G4 move toward the object side, second lens group G2 moves toward the image side plotting a convex trajectory, and fifth lens group G5 moves toward the object side. Sixth lens group G6 is fixed when zooming from the wide angle extremity to the telephoto extremity during imaging. Specifically, when zooming, the respective lens groups move along the optical axis such that the distance between first lens group G1 and second lens group G2 increases, the distance between second lens group G2 and third lens group G3 decreases, the distance between third lens group G3 and fourth lens group G4 increases, the distance between fourth lens group G4 and fifth lens group G5 increases, and the distance between fifth lens group G5 and sixth lens group G6 decreases.

In the zoom lens system according to Embodiment 3, when focusing from an object at infinity to a close object, fourth lens group G4 moves along the optical axis toward the image side.

It should be noted that all the lens elements (image blur correction lens elements) in third lens group G3 move in a direction perpendicular to the optical axis in order to optically correct image blur. The image blur correction lens elements enable the zoom lens system to correct image point movement caused by vibration throughout the system. Specifically, the zoom lens system is capable of optically correcting image blur caused by hand shaking, vibration, etc.

Embodiment 4

Figure 10:
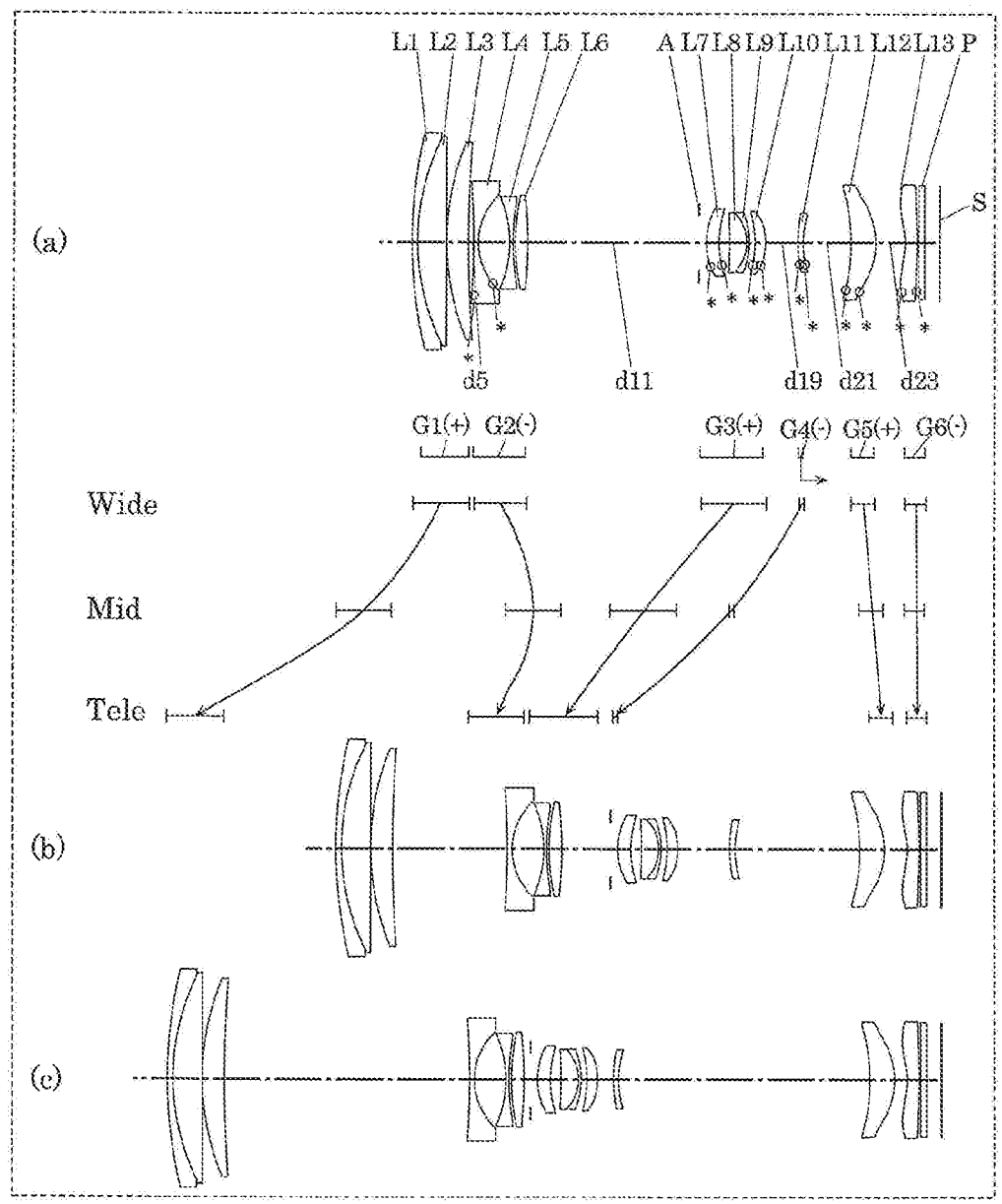
FIG. 10 is a lens arrangement diagram illustrating an infinity focusing state of an imaging optical system according to Embodiment 4 (Numerical Implementation Example 4)
Figure 11:
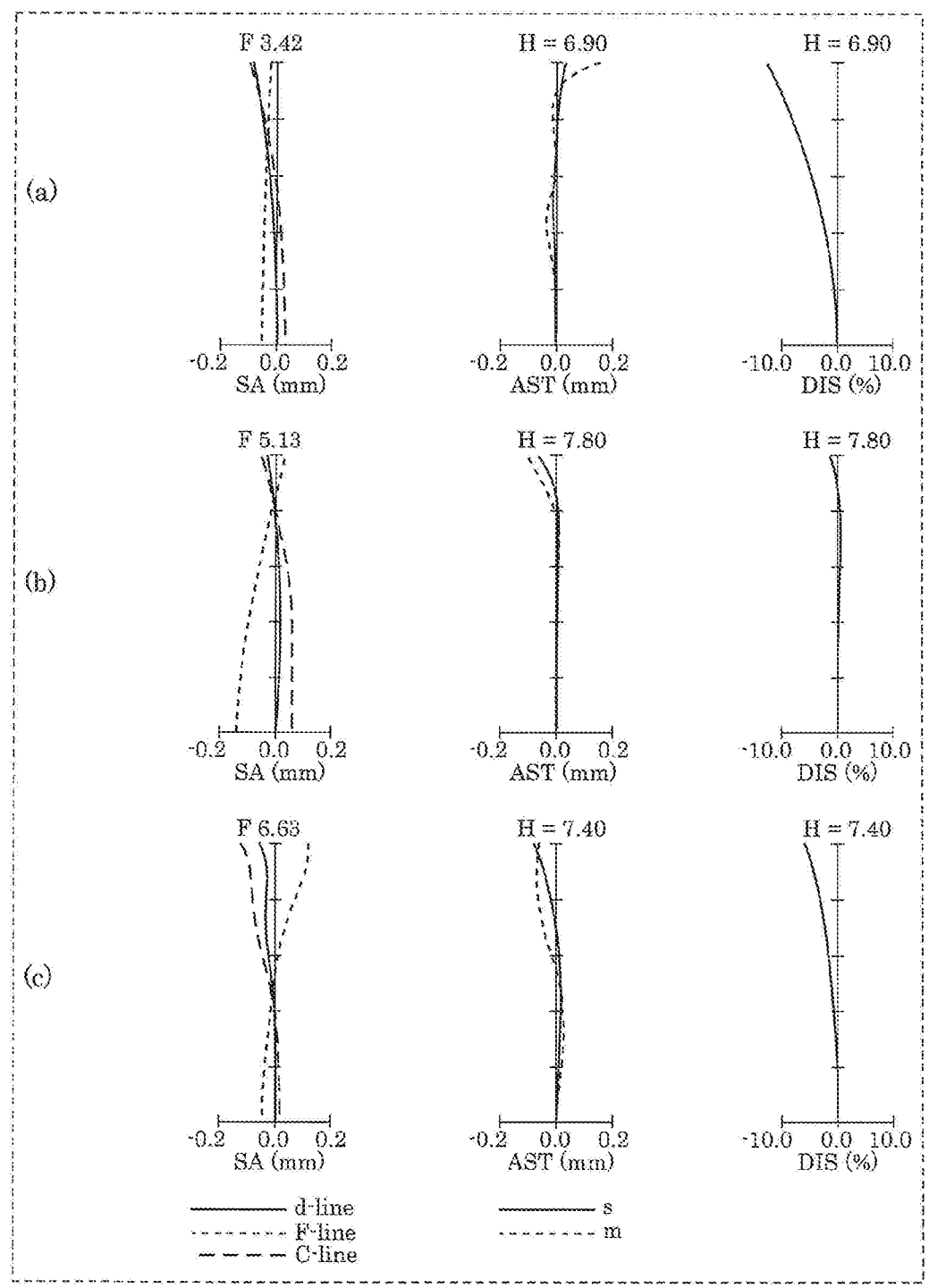
FIG. 11 illustrates longitudinal aberration in the infinity focusing state of the imaging optical system according to Numerical Implementation Example 4.
Figure 12:
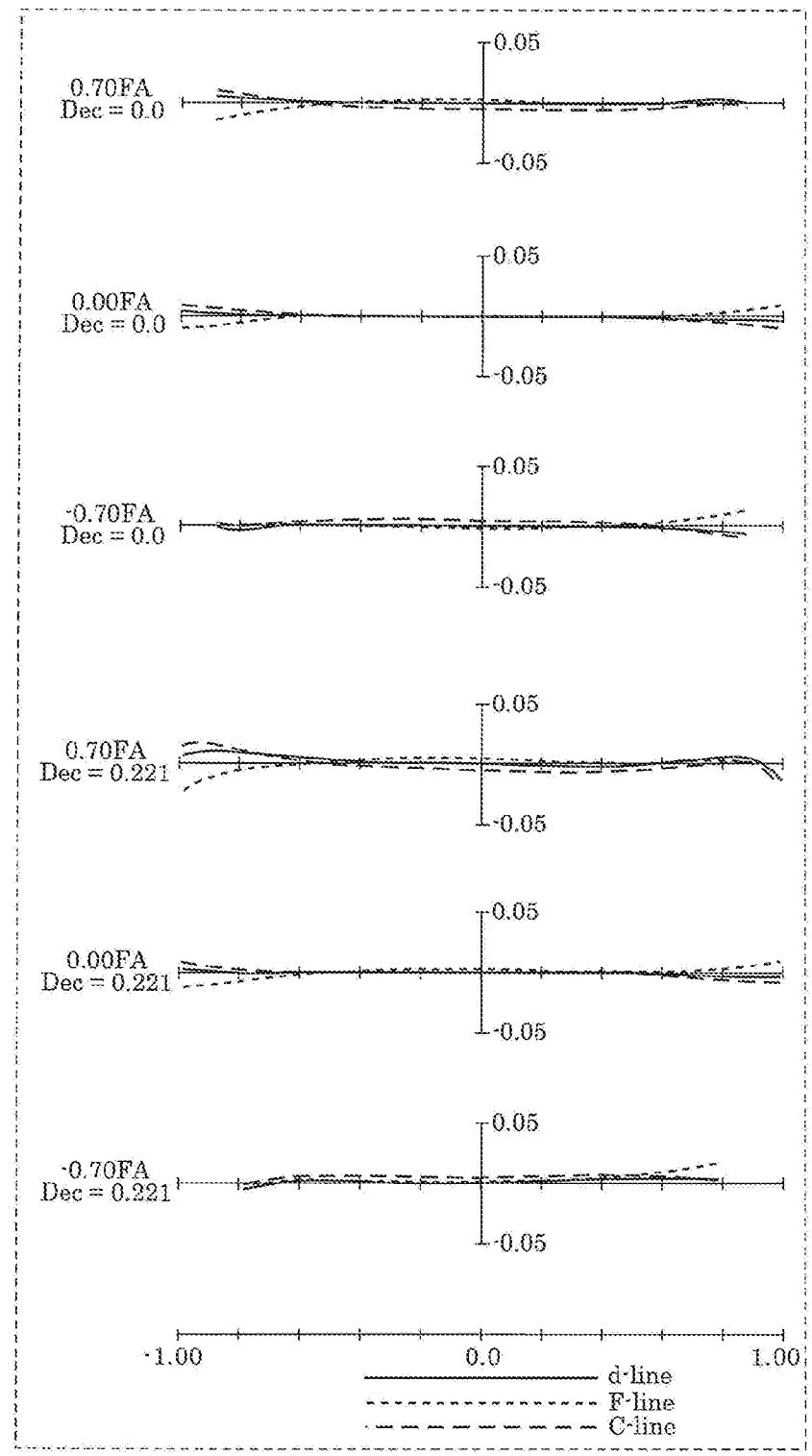
FIG. 12 illustrates lateral aberration in a basic state in which image blur correction is not carried out and an image blur corrected state, at the telephoto extremity of the imaging optical system according to Numerical Implementation Example 4.

FIG. 10 illustrates an imaging optical system according to Embodiment 4.

A zoom lens system includes, in order from the object side to the image side, first lens group G1 having positive power, second lens group G2 having negative power, third lens group G3 having positive power, fourth lens group G4 having negative power, fifth lens group G5 having positive power, sixth lens group G6 having negative power, and parallel plate P.

The zoom lens system forms an image at the position of imaging surface S.

First lens group G1 includes, in order from the object side to the image side, first lens element L1 having negative power, second lens element L2 having positive power, and third lens element L3 having positive power. First lens element L1 and second lens element L2 are cemented lenses bonded together by an adhesive, etc.

Second lens group G2 includes, in order from the object side to the image side, fourth lens element L4 having negative power, fifth lens element L5 having negative power, and sixth lens element L6 having positive power.

Third lens group G3 includes, in order from the object side to the image side, aperture diaphragm A, seventh lens element L7 having positive power, eighth lens element L8 having positive power, ninth lens element L9 having negative power, and tenth lens element L10 having positive power. Eighth lens element L8 and ninth lens element L9 are cemented lenses bonded together by an adhesive, etc.

Fourth lens group G4 is a single lens and includes eleventh lens element L11 having negative power.

Fifth lens group G5 is a single lens and includes twelfth lens element L12 having positive power.

Sixth lens group G6 is a single lens and includes thirteenth lens element L13 having negative power.

Next, each lens element will be described.

The lens elements in first lens group G1 will be described. First lens element L1 is a concave meniscus lens whose convex surface is on the object side. Second lens element L2 is a concave meniscus lens whose convex surface is on the object side. Third lens element L3 is a convex meniscus lens whose convex surface is on the object side.

The lens elements in second lens group G2 will be described. Fourth lens element L4 is a biconcave lens and has an aspheric shape on the object side and the image side. Fifth lens element L5 is a biconcave lens. Sixth lens element L6 is a biconvex lens.

The lens elements in third lens group G3 will be described. Seventh lens element L7 is a convex meniscus lens whose convex surface is on the object side, and has an aspheric shape on the object side and the image side. Eighth lens element L8 is a biconvex lens. Ninth lens element L9 is a concave meniscus lens whose convex surface is on the object side. Tenth lens element L10 is a convex meniscus lens whose concave surface is on the object side, and has an aspheric shape on the object side and the image side.

The lens element in fourth lens group G4 will be described. Eleventh lens element L11 is a concave meniscus lens whose convex surface is on the object side, and has an aspheric shape on the object side and the image side.

The lens element in fifth lens group G5 will be described. Twelfth lens element L12 is a convex meniscus lens whose concave surface is on the object side, and has an aspheric shape on the object side and the image side.

The lens element in sixth lens group G6 will be described. Thirteenth lens element L13 is a concave meniscus lens whose concave surface is on the object side, and has an aspheric shape on the object side and the image side.

In the zoom lens system according to Embodiment 4, when zooming from the wide angle extremity to the telephoto extremity during imaging, first lens group G1, third lens group G3, and fourth lens group G4 move toward the object side, second lens group G2 moves toward the image side plotting a convex trajectory, and fifth lens group G5 moves toward the object side. Sixth lens group G6 is fixed when zooming from the wide angle extremity to the telephoto extremity during imaging. Specifically, when zooming, the respective lens groups move along the optical axis such that the distance between first lens group G1 and second lens group G2 increases, the distance between second lens group G2 and third lens group G3 decreases, the distance between third lens group G3 and fourth lens group G4 increases, the distance between fourth lens group G4 and fifth lens group G5 increases, and the distance between fifth lens group G5 and sixth lens group G6 decreases.

In the zoom lens system according to Embodiment 4, when focusing from an object at infinity to a close object, fourth lens group G4 moves along the optical axis toward the image side.

It should be noted that all the lens elements (image blur correction lens elements) in third lens group G3 move in a direction perpendicular to the optical axis in order to optically correct image blur. The image blur correction lens elements enable the zoom lens system to correct image point movement caused by vibration throughout the system. Specifically, the zoom lens system is capable of optically correcting image blur caused by hand shaking, vibration, etc.

Embodiment 5

Figure 14:
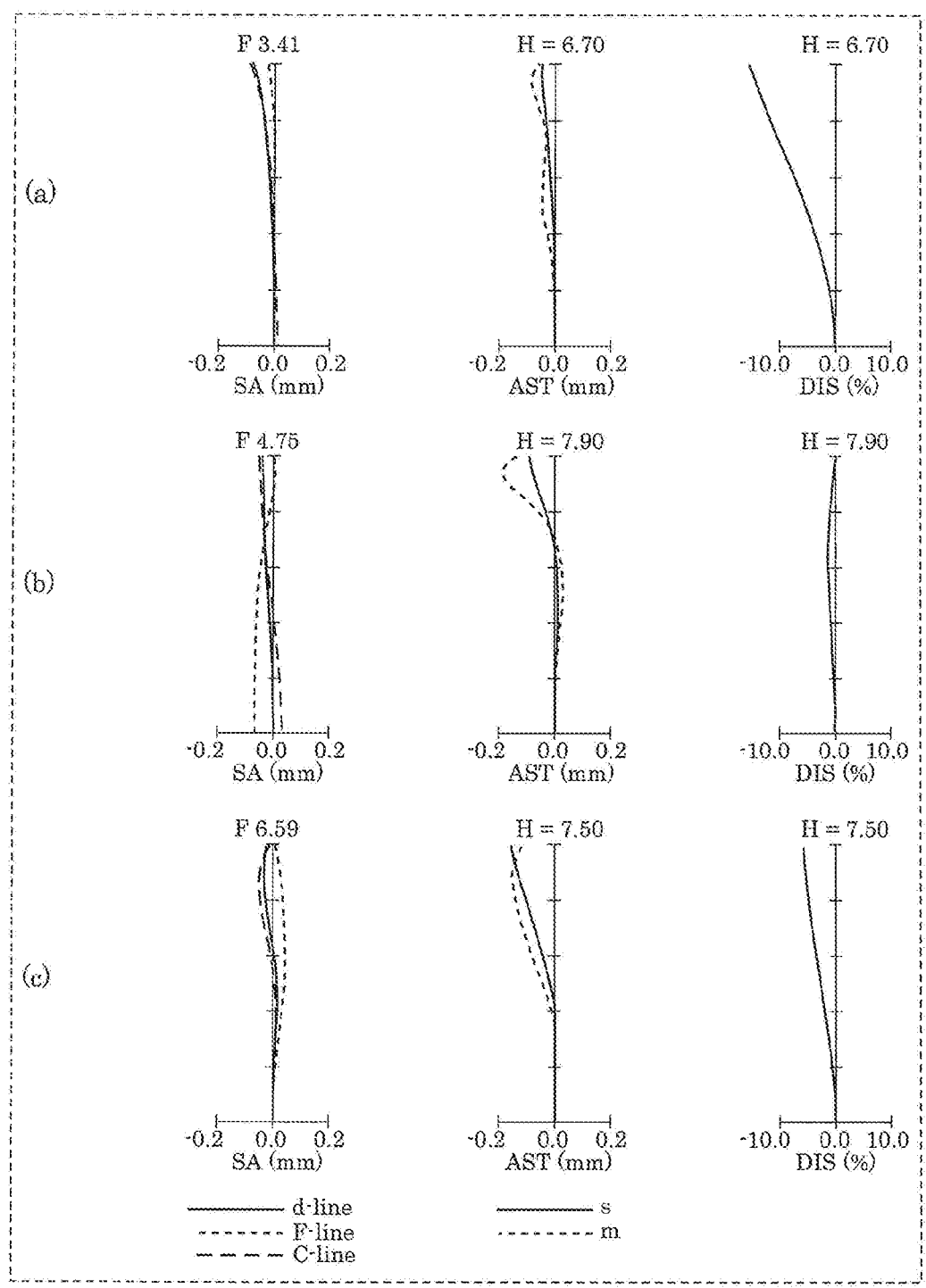
FIG. 14 illustrates longitudinal aberration in the infinity focusing state of the imaging optical system according to Numerical Implementation Example 5.
Figure 15:
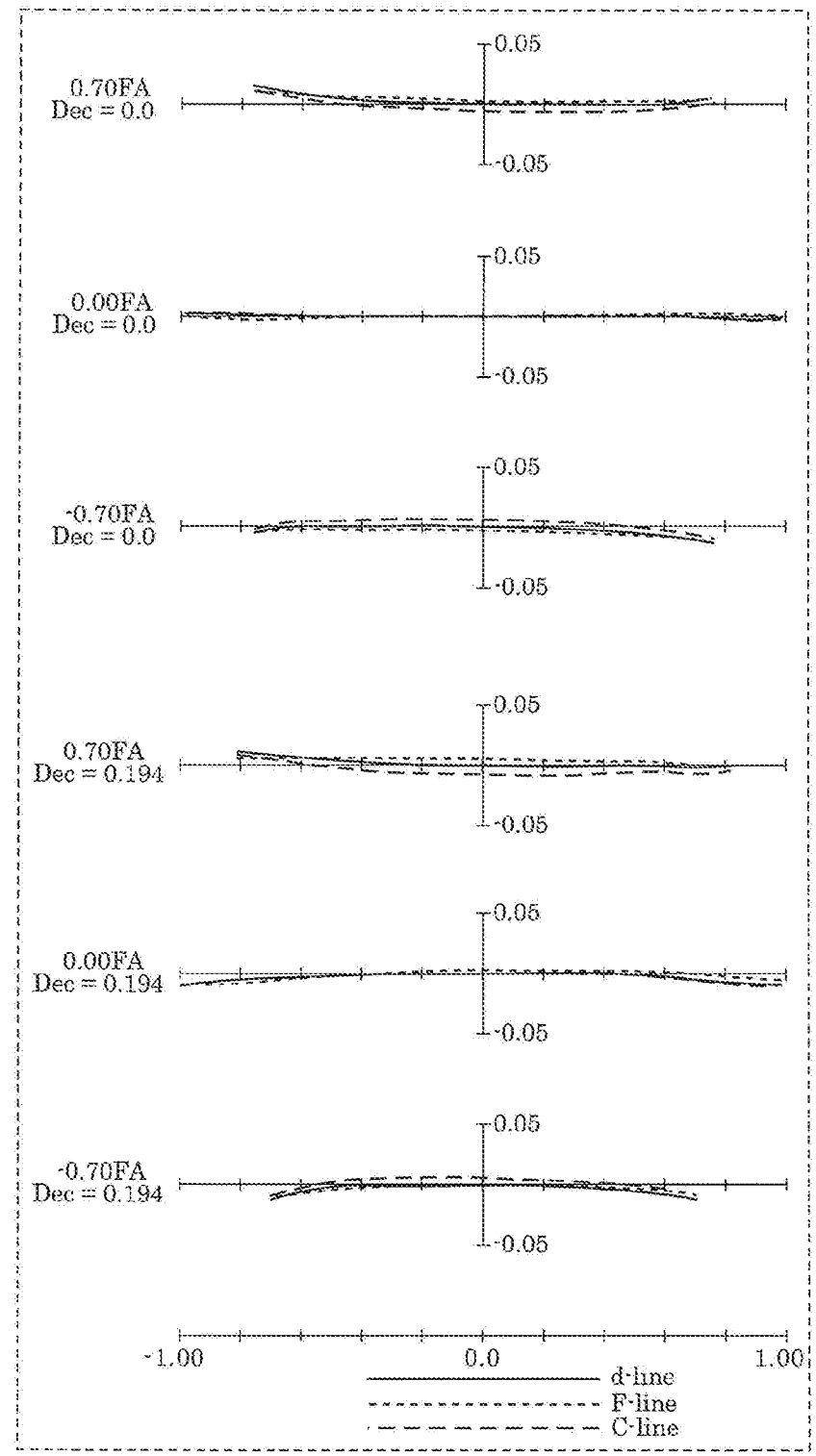
FIG. 15 illustrates lateral aberration in a basic state in which image blur correction is not carried out and an image blur corrected state, at the telephoto extremity of the imaging optical system according to Numerical Implementation Example 5.

FIG. 14 illustrates an imaging optical system according to Embodiment 5. A zoom lens system includes, in order from the object side to the image side, first lens group G1 having positive power, second lens group G2 having negative power, third lens group G3 having positive power, fourth lens group G4 having negative power, fifth lens group G5 having positive power, sixth lens group G6 having negative power, and parallel plate P.

The zoom lens system forms an image at the position of imaging surface S.

First lens group G1 includes, in order from the object side to the image side, first lens element L1 having negative power, second lens element L2 having positive power, and third lens element L3 having positive power. First lens element L1 and second lens element L2 are cemented lenses bonded together by an adhesive, etc.

Second lens group G2 includes, in order from the object side to the image side, fourth lens element L4 having negative power, fifth lens element L5 having negative power, and sixth lens element L6 having positive power.

Third lens group G3 includes, in order from the object side to the image side, aperture diaphragm A, seventh lens element L7 having positive power, eighth lens element L8 having positive power, ninth lens element L9 having negative power, and tenth lens element L10 having positive power. Eighth lens element L8 and ninth lens element L9 are cemented lenses bonded together by an adhesive, etc.

Fourth lens group G4 is a single lens and includes eleventh lens element L11 having negative power.

Fifth lens group G5 includes, in order from the object side to the image side, twelfth lens element L12 having positive power, and thirteenth lens element L13 having positive power.

Sixth lens group G6 is a single lens and includes fourteenth lens element L14 having negative power.

Next, each lens element will be described.

The lens elements in first lens group G1 will be described. First lens element L1 is a concave meniscus lens whose convex surface is on the object side. Second lens element L2 is a biconvex lens. Third lens element L3 is a convex meniscus lens whose convex surface is on the object side.

The lens elements in second lens group G2 will be described. Fourth lens element L4 is a biconcave lens and has an aspheric shape on the object side and the image side. Fifth lens element L5 is a biconcave lens and has an aspheric shape on the object side and the image side. Sixth lens element L6 is a biconvex lens.

The lens elements in third lens group G3 will be described. Seventh lens element L7 is a convex meniscus lens whose convex surface is on the object side, and has an aspheric shape on the object side and the image side. Eighth lens element L8 is a biconvex lens. Ninth lens element L9 is a biconcave lens. Tenth lens element L10 is a biconvex lens and has an aspheric shape on the object side and the image side.

The lens element in fourth lens group G4 will be described. Eleventh lens element L11 is a concave meniscus lens whose convex surface is on the object side, and has an aspheric shape on the object side and the image side.

The lens element in fifth lens group G5 will be described. Twelfth lens element L12 is a convex meniscus lens whose concave surface is on the object side, and has an aspheric shape on the object side and the image side. Thirteenth lens element L13 is a convex meniscus lens whose concave surface is on the object side, and has an aspheric shape on the object side and the image side.

The lens element in sixth lens group G6 will be described. Fourteenth lens element L14 is a concave meniscus lens whose concave surface is on the object side, and has an aspheric shape on the object side and the image side.

In the zoom lens system according to Embodiment 5, when zooming from the wide angle extremity to the telephoto extremity during imaging, first lens group G1, third lens group G3, and fourth lens group G4 move toward the object side, second lens group G2 moves toward the image side plotting a convex trajectory, and fifth lens group G5 moves toward the object side. Sixth lens group G6 is fixed when zooming from the wide angle extremity to the telephoto extremity during imaging. Specifically, when zooming, the respective lens groups move along the optical axis such that the distance between first lens group G1 and second lens group G2 increases, the distance between second lens group G2 and third lens group G3 decreases, the distance between third lens group G3 and fourth lens group G4 increases, the distance between fourth lens group G4 and fifth lens group G5 increases, and the distance between fifth lens group G5 and sixth lens group G6 decreases.

In the zoom lens system according to Embodiment 5, when focusing from an object at infinity to a close object, fourth lens group G4 moves along the optical axis toward the image side.

It should be noted that all the lens elements (image blur correction lens elements) in third lens group G3 move in a direction perpendicular to the optical axis in order to optically correct image blur. The image blur correction lens elements enable the zoom lens system to correct image point movement caused by vibration throughout the system. Specifically, the zoom lens system is capable of optically correcting image blur caused by hand shaking, vibration, etc.

Other Embodiments

As described above, techniques disclosed in the present application have been exemplified by way of Embodiments 1 through 5. However, the techniques disclosed in the present disclosure are not limited to these examples, and can also be applied to embodiments in which modifications, replacements, additions, and omissions have been made.

The number of lens groups, the number of lens elements in a lens group, etc, are substantial numbers, and lenses that substantially have no power may be added.

Although all the lens elements of third lens group G3 are provided as front image blur correction lens elements, it is acceptable to have part of the lens elements of third lens group G3 as the front image blur correction lens elements.

Although image blur correction is performed by causing the image blur correction lens elements to move in a direction perpendicular to the optical axis, as long as the movement method causes the image blur correction lens elements to move in a manner in which a component in the perpendicular direction is maintained, image blur can be corrected. For example, if making the barrel structure complicated is permitted, image blur correction may be performed by rotating the image blur correction lens elements while maintaining a center of rotation provided on the optical axis.

As an example in which third lens group G3 includes a diaphragm, a form in which the diaphragm is included at a position in the third lens group which is closest to the object is described, but the diaphragm may be included at a position in the third lens group which is closest to in the image. The diaphragm may be included between any two lens elements of the third lens group. It is sufficient that the diaphragm is included in position that moves integrally with the third lens group when zooming.

Conditions, Effects, Etc

Hereinafter, conditions that, for example, the imaging optical systems according to Embodiments 1 through 5 can satisfy will be described. Note that a plurality of satisfiable conditions are stipulated for the imaging optical systems according to Embodiments 1 through 5; an imaging optical system configuration that satisfies all of these conditions is most effective. However, it is possible to achieve an imaging optical system that yields individual advantageous effects by satisfying the individual conditions they correspond to.

Each of the zoom lens systems according to Embodiments 1 through 5 includes, in order from the object side to the image side, first lens group G1 having positive power, second lens group G2 having negative power, third lens group G3 having positive power, fourth lens group G4 having negative power, fifth lens group G5 having positive power, and sixth lens group G6 having power. During zooming from wide angle extremity to telephoto extremity, the distance between respective lens groups changes. Fifth lens group G5 includes at most two lens elements, at least one of which is a convex meniscus lens element having a concave surface facing the object side.

With this, the aberration fluctuation, particularly distortion aberration fluctuation, accompanying zooming from wide angle extremity to telephoto extremity can be reduced while limiting fifth lens group G5 to at most two lens elements. Because of this, a zoom lens system that is small and achieves excellent optical performance over the entire zoom range can be realized.

Moreover, for example, the zoom lens system may satisfy condition (1) below.

$$3.8 < |\beta 2T/\beta 2W| < 7.0 \tag{1}$$

where:

ß2T denotes the lateral magnification of second lens group G2 at telephoto extremity; and ß2W denotes the lateral magnification of second lens group G2 at wide angle extremity Condition (1) is a condition for stipulating the ratio between the lateral magnification of second lens group G2 at telephoto extremity and the lateral magnification of second lens group G2 at wide angle extremity. Below the lower limit of condition (1), the amount of movement of second lens group G2 during zooming from wide angle extremity to telephoto extremity becomes too large, and thus making it difficult to provide a compact lens barrel and imaging device. Furthermore, above the upper limit of condition (1), the lateral magnification of second lens group G2 at telephoto extremity becomes too large, and thus making it difficult to correct various aberrations, particularly field curvature.

For example, the above-described advantageous effect can be further achieved by satisfying either one or both of conditions (1a) and (1b) below.

$$4.0 < |\beta 2T/\beta 2W| \quad (1a)$$

$$|\beta 2T/\beta 2W| < 6.0 \quad (1b)$$

For example, the above-described advantageous effect can be further achieved by satisfying either one or both of conditions (1c) and (1d) below.

$$4.2 < |\beta 2T/\beta 2W| \quad (1c)$$

$$|\beta 2T/\beta 2W| < 5.0 \quad (1d)$$

Moreover, for example, the zoom lens system may satisfy condition (2) below.

$$1.2 < |\beta 4T/\beta 4W| < 4.0 \quad (2)$$

where:
β4T denotes the lateral magnification of fourth lens group G4 at telephoto extremity; and
β4W denotes the lateral magnification of fourth lens group G4 at wide angle extremity Condition (2) is a condition for stipulating the ratio between the lateral magnification of fourth lens group G4 at telephoto extremity and the lateral magnification of fourth lens group G4 at wide angle extremity. Below the lower limit of condition (2), the amount of movement of fourth lens group G4 during zooming from wide angle extremity to telephoto extremity becomes too large, and thus making it difficult to provide a compact lens barrel and imaging device. Furthermore, above the upper limit of condition (2), the lateral magnification of fourth lens group G4 at telephoto extremity becomes too large, and thus making it difficult to correct various aberrations, particularly field curvature.

For example, the above-described advantageous effect can be further achieved by satisfying either one or both of conditions (2a) and (2b) below.

$$1.25 < |\beta 4T/\beta 4W| \quad (2a)$$

$$|\beta 4T/\beta 4W| < 3.0 \quad (2b)$$

For example, the above-described advantageous effect can be further achieved by satisfying either one or both of conditions (2c) and (2d) below.

$$1.30 < |\beta 4T/\beta 4W| \quad (2c)$$

$$|\beta 4T/\beta 4W| < 2.0 \quad (2d)$$

Moreover, for example, the zoom lens system may satisfy condition (3) below.

$$LT/fT < 1.08 \quad (3)$$

where:
LT denotes the total optical length at telephoto extremity; and
fT denotes the focal length at telephoto extremity Condition (3) is a condition for stipulating the ratio between the optical total length and the focal length at telephoto extremity. Above the upper limit of condition (3), the optical total length relative to the focal length at the telephoto extremity becomes too great, and thus making it difficult to provide a compact lens barrel and imaging device.

For example, the above-described advantageous effect can be further achieved by satisfying condition (3a) below.

$$LT/fT < 1.04 \quad (3a)$$

For example, the above-described advantageous effect can be further achieved by satisfying condition (3b) below.

$$LT/fT < 1.00 \quad (3b)$$

Moreover, for example, the zoom lens system may satisfy condition (4) below.

$$10.2 < fT/fW \quad (4)$$

where:
fT denotes the focal length at the telephoto extremity; and
fW denotes the focal length at the wide angle extremity Condition (4) is a condition for stipulating the ratio between the focal length at telephoto extremity and the focal length at wide angle extremity. Above the lower limit of condition (4), the zoom magnification becomes small, and a zoom lens with high magnification cannot be provided.

For example, the above-described advantageous effect can be further achieved by satisfying condition (4a) below.

$$11.0 < fT/fW \quad (4a)$$

For example, the above-described advantageous effect can be further achieved by satisfying condition (4b) below.

$$12.5 < fT/fW \quad (4b)$$

Furthermore, for example, in the zoom lens system, fourth lens group G4 may be composed of one lens element.

Accordingly, the reduction in the number of required lens elements enables miniaturization and cost reduction. Furthermore, by being able to reduce weight, high-speed focusing becomes possible.

Furthermore, for example, in the zoom lens system, during image blur correction, the entirety or a part of third lens group G3 moves relative to the optical axis while maintaining a component in the perpendicular direction.

This makes it possible to make the lens diameter small, and enables miniaturization and weight reduction of the image blur correction lens group. Therefore, the image blur correction lens group can be driven using a simple drive mechanism. In particular, when the image blur correction lens group is composed of only one lens element, the drive mechanism of the image blur correction lens group can be further simplified.

Furthermore, for example, in the zoom lens system, third lens group G3 may include diaphragm A.

Accordingly, the barrel configuration can be simplified, and miniaturization of the lens barrel becomes possible.

Outline Configuration of Imaging Device to which Embodiment 1 is Applied

Figure 16:
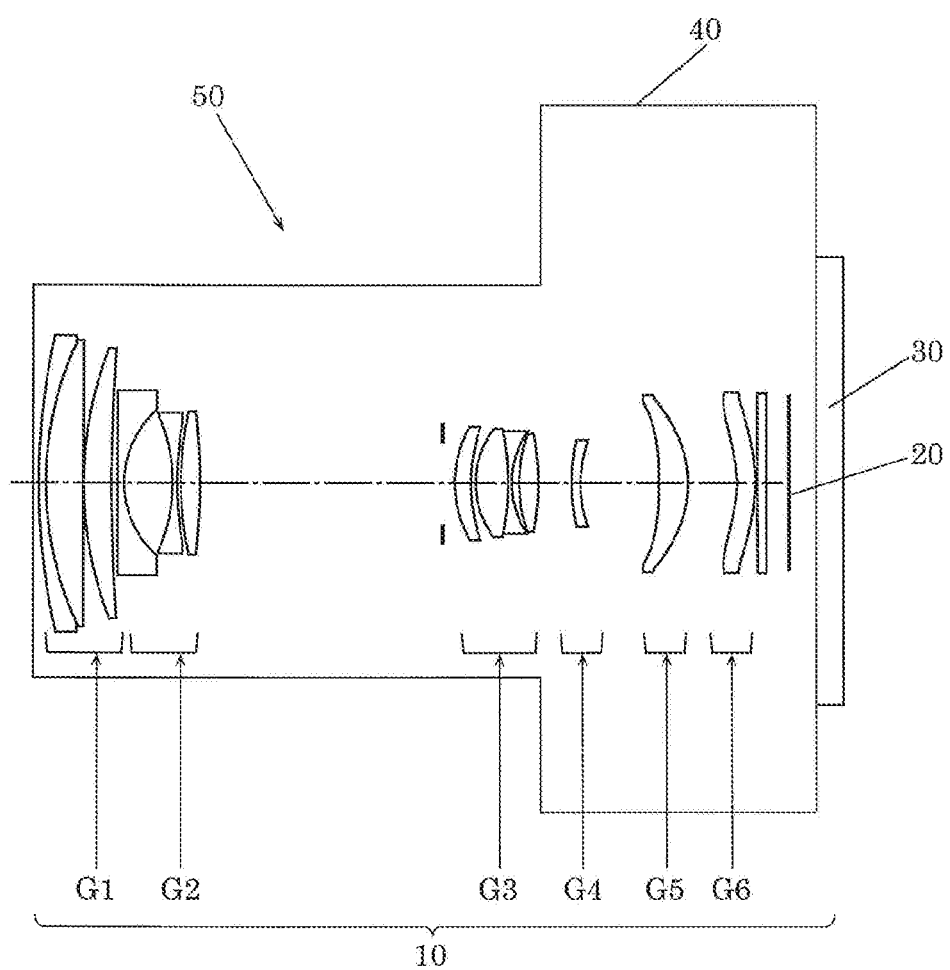
FIG. 16 illustrates an outline configuration of a digital still camera according to Embodiment 1.

FIG. 16 is an outline configuration diagram of digital camera 50 to which the zoom lens system according to Embodiment 1 is applied. It should be noted that the zoom lens systems according to Embodiments 2 through 5 can also be applied.

Digital camera 50 includes housing 40, zoom lens system 10 including imaging element 20, and monitor 30.

Imaging element 20 is disposed at the position of imaging surface S of zoom lens system 10.

Zoom lens system 10 includes an actuator, lens frame, etc., so that all the lens groups from first lens group G1 to sixth lens group G6 move along the optical axis during zooming, in the same manner as in Embodiment 1.

It should be noted that although an example is given in which the above-described zoom lens system according to Embodiment 1 is applied to a digital camera, the zoom lens system can also be applied to a smartphone, an interchangeable lens camera, etc.

NUMERICAL IMPLEMENTATION EXAMPLES

Hereinafter, numerical implementation examples obtained when the zoom lens systems according to Embodiments 1 through 5 are specifically carried out will be described. Note that in the numerical implementation examples, the unit of length is denoted in "mm" and the unit for angle of view is denoted in "°". Furthermore, in each of the numerical implementation examples, "d" is the distance between surfaces, "nd" is the refractive index relative to the d-line, and "vd" is the Abbe number relative to the d-line. Moreover, in each of the numerical implementation examples, surfaces marked with an asterisk are aspheric surfaces, whose shapes are defined by the following equation.

$$Z = \frac{h^2/r}{1+\sqrt{1-(1+\kappa)(h/r)^2}} + \sum A_n h^n \quad [\text{Math. 1}]$$

where:
Z is the distance from a point on the aspheric surface at a height h from the optical axis to a tangent plane of the peak of the aspheric surface;
h is height from the optical axis;
r is the peak curvature radius;
κ is the conic constant; and
An is the n-th order aspheric coefficient FIG. 2, FIG. 5, FIG. 8, FIG. 11, and FIG. 14 respectively illustrate longitudinal aberration when the imaging optical systems according to Embodiments 1 through 5 are in the infinity focusing state.

In each drawing illustrating longitudinal aberration, (a) illustrates aberration at the wide angle extremity, (b) illustrates aberration at a middle position, and (c) illustrates aberration at the telephoto extremity. Each drawing illustrating longitudinal aberration illustrates, in order from the left side, spherical aberration (SA (mm)), astigmatism (AST (mm)), and distortion (DIS (%)). In each spherical aberration illustration, F number (marked as "F" in the drawings) is represented on the vertical axis, the solid line represents the d-line, the short dashed line represents the F-line, and the long dashed line represents the C-line. In each astigmatism illustration, image height (marked as "H" in the drawings) is represented on the vertical axis, the solid line represents the sagittal plane (marked as "s" in the drawings), and the dashed line represents the meridional plane (marked as "m" in the drawings). In each distortion illustration, image height (marked as "H" in the drawings) is represented on the vertical axis.

FIG. 3, FIG. 6, FIG. 9, FIG. 12, and FIG. 15 respectively illustrate lateral aberrations at the telephoto extremity of the imaging optical systems according to Embodiments 1 through 5.

In each drawing illustrating lateral aberration, the upper three aberration diagrams correspond to a basic state in which telephoto extremity image blur correction is not carried out, and the lower three aberration diagrams correspond to an telephoto extremity image blur corrected state in which the image blur correction lens group is caused to move a predetermined amount in a direction perpendicular to the optical axis. Among the respective lateral aberration illustrations for the basic state, the top stage corresponds to the lateral aberration at the 70% image point of maximum image height, the middle stage corresponds to the lateral aberration at the image point on the axis, and the bottom stage corresponds to later aberration at the −70% image point of maximum image height. Among the respective lateral aberration illustrations for the image blur corrected state, the top stage corresponds to the lateral aberration at the 70% image point of maximum image height, the middle stage corresponds to the lateral aberration at the image point on the axis, and the bottom stage corresponds to later aberration at the −70% image point of maximum image height. Furthermore, in each lateral aberration illustration, the distance from the main light flux at a pupil surface is represented on the horizontal axis, the solid line represents the d-line, the short dashed line represents the F-line, and the long dashed line represents the C-line. It should be noted that in each lateral aberration illustration, the meridional plane is the plane that includes the optical axis of first lens group G1 and/or third lens group G3 (Embodiments 1 through 5).

It should be noted that, in the imaging optical system in each implementation example, the amount of movement in a direction perpendicular to the optical axis by the image blur correction lens group in the image blur correction state at the telephoto extremity is as indicated below.

Numerical implementation example 1: 0.201 mm
Numerical implementation example 2: 0.193 mm
Numerical implementation example 3: 0.221 mm
Numerical implementation example 4: 0.221 mm
Numerical implementation example 5: 0.194 mm The image eccentric quantity when the photographing distance is ∞ and the imaging optical system tilts 0.4 degrees at the telephoto extremity is equal to the imaging eccentric when the image blur correction lens group moves in parallel in a direction perpendicular to the optical axis by the respective values described above.

As is clear from the respective lateral aberration illustrations, it can be understood that the symmetry of the lateral aberration at the image points on the axis is good. Furthermore, when the lateral aberration at +70% image point and the lateral aberration at −70% image point are compared in the basic state, both have a small curvature and the inclination of the aberration curve are approximately equal. From this, it can be understood that the eccentric coma aberration and the eccentric astigmatism are small. This means that sufficient imaging performance is obtained even in the image blur correction state. Furthermore, when the image blur correction angle of the imaging optical system is the same, the amount of parallel movement required for image blur correction decreases as the focal length of the entire imaging optical system becomes short. Therefore, sufficient image blur correction can be performed with respect to approximately 0.4 degree image blur correction angle without deterioration of imaging performance, in any of the zoom positions.

Numerical Implementation Example 1

The imaging optical system according to Numerical implementation example 1 corresponds to Embodiment 1 illustrated in FIG. 1. The surface data of the imaging optical system of Numerical implementation example 1 is indicated in List 1, the aspheric surface data in List 2, and the various data in the infinity focusing state in List 3A to List 3D.

[LIST 1: SURFACE DATA]

| Surface number | r | d | nd | vd |
|---|---|---|---|---|
| Object surface | ∞ | | | |
| 1 | 65.08220 | 0.75000 | 1.90055 | 29.3 |
| 2 | 33.24520 | 3.32000 | 1.60051 | 62.5 |
| 3 | 447.82500 | 0.15000 | | |
| 4 | 35.22300 | 2.67000 | 2.67000 | 61.8 |
| 5 | 194.55250 | Variable | | |
| 6* | 20715.61420 | 0.70000 | 1.85008 | 40.9 |
| 7* | 9.70360 | 4.52670 | | |
| 8 | −17.68630 | 0.50000 | 1.78527 | 45.1 |
| 9 | 65.68980 | 0.15000 | | |
| 10 | 29.34160 | 1.74000 | 1.94595 | 18.0 |
| 11 | −68.61040 | Variable | | |
| 12 (diaphragm) | ∞ | 1.00000 | | |
| 13* | 12.69490 | 1.61000 | 1.85343 | 40.5 |
| 14* | 29.59820 | 0.25000 | | |
| 15 | 8.14880 | 3.03000 | 1.49700 | 81.6 |
| 16 | −34.16460 | 0.50000 | 1.80760 | 33.4 |
| 17 | 9.75510 | 0.76670 | | |
| 18 | 15.66100 | 1.71000 | 1.56015 | 67.2 |
| 19* | −21.15820 | Variable | | |
| 20* | 25.63760 | 0.60000 | 1.77010 | 49.8 |
| 21* | 10.64500 | Variable | | |
| 22* | −71.48740 | 2.64000 | 1.53380 | 55.6 |
| 23* | −11.99110 | Variable | | |
| 24* | −10.43400 | 1.75000 | 1.53380 | 55.6 |
| 25* | −14.85310 | 0.15000 | | |
| 26 | ∞ | 0.90000 | 1.51680 | 64.2 |
| 27 | ∞ | 2.18000 | | |
| 28 | ∞ | BF | | |
| Image surface | ∞ | | | |

[LIST 2: ASPHERIC SURFACE DATA]

Sixth surface

K = 0.00000E+00, A4 = −6.60517E−06, A6 = 5.65030E−07,
A8 = −6.07822E−09, A10 = 1.75035E−11

Seventh surface

K = −6.33768E−01, A4 = 6.54945E−05, A6 = 1.60098E−07,
A8 = 4.87956E−08, A10 = −4.36918E−10

Thirteenth surface

K = 0.00000E+00, A4 = 1.62681E−04, A6 = 2.53177E−06,
A8 = −3.34183E−08, A10 = 8.58050E−10

Fourteenth surface

K = 0.00000E+00, A4 = 2.05939E−04, A6 = 2.03376E−06,
A8 = −6.76225E−08, A10 = 6.36899E−10

Nineteenth surface

K = 0.00000E+00, A4 = 2.98056E−04, A6 = 4.78127E−06,
A8 = 1.02203E−07, A10 = 4.28923E−09

Twentieth surface

K = 0.00000E+00, A4 = −6.16064E−04, A6 = 3.69186E−05,
A8 = −8.17055E−07, A10 = 2.21718E−09

Twenty-first surface

K = 0.00000E+00, A4 = −6.86454E−04, A6 = 4.13899E−05,
A8 = −1.00486E−06, A10 = 5.35241E−09

Twenty-second surface

K = 0.00000E+00, A4 = −1.66930E−04, A6 = −3.25429E−06,
A8 = 1.96793E−08, A10 = 2.61562E−10

Twenty-third surface

K = −1.39681E+00, A4 = 4.12808E−05, A6 = −3.60205E−06,
A8 = 1.53315E−08, A10 = 2.56461E−10

Twenty-fourth surface

K = 0.00000E+00, A4 = 9.42408E−04, A6 = −9.58525E−06,
A8 = 6.60944E−08 A10 = 1.03031E−10

Twenty-fifth surface

K = 0.00000E+00, A4 = 4.27163E−04, A6 = −5.17137E−06,
A8 = −9.67724E−10, A10 = 4.20135E−10

[VARIOUS DATA IN INFINITY FOCUSING STATE]

[LIST 3A: VARIOUS DATA]
Zoom ratio 14.43726

| | Wide angle | Middle | Telephoto |
|---|---|---|---|
| Focal length | 9.0014 | 34.1094 | 129.9556 |
| F number | 3.42002 | 5.16673 | 6.63031 |
| Angle of view | 40.8920 | 12.9052 | 3.4325 |
| Image height | 6.6000 | 7.8000 | 7.4000 |
| Total lens length | 70.9780 | 84.2540 | 104.9768 |
| BF | 0.01911 | 0.07727 | −0.01236 |
| d5 | 0.5000 | 15.2050 | 33.9883 |
| d11 | 23.3802 | 8.1522 | 1.0000 |
| d19 | 3.3488 | 7.0507 | 5.1752 |
| d21 | 7.3850 | 19.4629 | 32.2323 |
| d23 | 4.7515 | 2.7125 | 1.0000 |
| Entrance pupil position | 15.7443 | 44.3227 | 153.2295 |
| Exit pupil position | −36.0090 | −125.0505 | 2461.5750 |
| Front principal point position | 22.4967 | 69.1340 | 290.0460 |
| Rear principal point position | 61.9766 | 50.1446 | −24.9788 |

[LIST 3B: SINGLE LENS DATA]

| Lens | First surface | Focal length |
|---|---|---|
| 1 | 1 | −76.3174 |
| 2 | 2 | 59.6215 |
| 3 | 4 | 70.3887 |
| 4 | 6 | −11.4205 |
| 5 | 8 | −17.6982 |
| 6 | 10 | 21.9160 |
| 7 | 13 | 24.9526 |
| 8 | 15 | 13.5609 |
| 9 | 16 | −9.3487 |
| 10 | 18 | 16.3389 |
| 11 | 20 | −24.0562 |
| 12 | 22 | 26.5805 |
| 13 | 24 | −76.2003 |

[LIST 3C: ZOOM LENS GROUP DATA]

| Group | First surface | Focal length | Lens configuration length | Front principal point position | Rear principal point position |
|---|---|---|---|---|---|
| 1 | 1 | 57.01881 | 6.89000 | 1.43824 | 4.03128 |
| 2 | 6 | −10.21128 | 7.61670 | 0.51214 | 1.79449 |
| 3 | 12 | 13.79533 | 8.86670 | 1.54490 | 3.69539 |
| 4 | 20 | −24.05620 | 0.60000 | 0.58990 | 0.84493 |
| 5 | 22 | 26.58049 | 2.64000 | 2.03666 | 2.98162 |
| 6 | 24 | −76.20026 | 2.80000 | −3.12456 | −2.39125 |

[LIST 3D: ZOOM LENS GROUP MAGNIFICATION]

| Group | First surface | Wide angle | Middle | Telephoto |
|---|---|---|---|---|
| 1 | 1 | 0.00000 | 0.00000 | 0.00000 |
| 2 | 6 | −0.23782 | −0.36170 | −1.08074 |
| 3 | 12 | −0.46619 | −0.88270 | −0.87208 |
| 4 | 20 | 1.85911 | 2.20786 | 2.62433 |
| 5 | 22 | 0.69819 | 0.77308 | 0.84031 |
| 6 | 24 | 1.09699 | 1.09775 | 1.09657 |

Numerical Implementation Example 2

The imaging optical system according to Numerical implementation example 2 corresponds to Embodiment 2 illustrated in FIG. 4. The surface data of the imaging optical system of Numerical implementation example 2 is indicated in List 4, the aspheric surface data in List 5, and the various data in the infinity focusing state in List 6A to List 6D.

[LIST 4: SURFACE DATA]

| Surface number | r | d | nd | vd |
|---|---|---|---|---|
| Object surface | ∞ | | | |
| 1 | 79.09630 | 0.75000 | 1.90037 | 29.4 |
| 2 | 38.73000 | 3.32000 | 1.59075 | 63.7 |
| 3 | −1766.73980 | 0.15000 | | |
| 4 | 37.87980 | 2.67000 | 1.59288 | 63.4 |
| 5 | 183.79770 | Variable | | |
| 6* | 600.20690 | 0.70000 | 1.84702 | 41.2 |
| 7* | 9.73850 | 4.56320 | | |
| 8* | −17.49850 | 0.50000 | 1.77354 | 45.8 |
| 9* | 87.35140 | 0.15400 | | |
| 10 | 32.61940 | 1.74000 | 1.94595 | 18.0 |
| 11 | −62.96600 | Variable | | |
| 12 (diaphragm) | ∞ | 1.00000 | | |
| 13* | 12.62280 | 1.61000 | 1.85343 | 40.5 |
| 14* | 29.24210 | 0.25000 | | |
| 15 | 8.08830 | 3.03000 | 1.49710 | 81.6 |
| 16 | −36.40950 | 0.50000 | 1.80612 | 33.3 |
| 17 | 9.60950 | 0.76440 | | |
| 18 | 15.27650 | 1.71000 | 1.55625 | 68.7 |
| 19* | −21.50980 | Variable | | |
| 20* | 22.92530 | 0.60000 | 1.77010 | 49.8 |
| 21* | 10.26280 | Variable | | |
| 22* | −92.38840 | 2.64000 | 1.53380 | 55.6 |
| 23* | −12.48680 | Variable | | |
| 24* | −10.64130 | 1.75000 | 1.53380 | 55.6 |
| 25* | −15.95980 | 0.15000 | | |
| 26 | ∞ | 0.90000 | 1.51680 | 64.2 |
| 27 | ∞ | 2.18000 | | |
| 28 | ∞ | BF | | |
| Image surface | ∞ | | | |

[LIST 5: ASPHERIC SURFACE DATA]

Sixth surface

K = 0.00000E+00, A4 = −3.08046E−05, A6 = 1.09794E−06,
A8 = −1.16733E−08 A10 = 3.52112E−11

Seventh surface

K = −7.07767E−01, A4 = 5.25522E05, A6 = 5.05807E−07,
A8 = 5.56733E−08 A10 = −4.40772E−10

Eighth surface

K = 0.00000E+00, A4 = 1.61694E−05, A6 = 4.64672E−07,
A8 = 3.71509E−09 A10 = −8.32172E−11

Ninth surface

K = 0.00000E+00, A4 = 4.29794E−06, A6 = 3.47953E−07,
A8 = −2.95727E−09 A10 = −9.22582E−11

Thirteenth surface

K = 0.00000E+00, A4 = 1.60246E−04, A6 = 2.59696E−06,
A8 = −3.45371E−08 A10 = 8.91632E−10

Fourteenth surface

K = 0.00000E+00, A4 = 2.07279E−04, A6 = 1.99945E−06,
A8 = −6.43416E−08 A10 = 6.03259E−10

Nineteenth surface

K = 0.00000E+00, A4 = 3.04278E−04, A6 = 5.15183E−06,
A8 = 8.87917E−08 A10 = 4.85671E−09

Twentieth surface

K = 0.00000E+00, A4 = −6.11168E−04, A6 = 3.60432E−05,
A8 = −8.32854E−07 A10 = 3.79052E−09

Twenty-first surface

K = 0.00000E+00, A4 = −6.90002E−04, A6 = 4.02663E−05,
A8 = −1.02289E−06 A10 = 7.34110E−09

Twenty-second surface

K = 0.00000E+00, A4 = −2.19898E−04, A6 = −3.07757E−06,
A8 = 2.59417E−08 A10 = 2.24241E−10

Twenty-third surface

K = −9.09278E−01, A4 = 1.05981E−05, A6 = −3.11392E−06,
A8 = 1.71146E−08 A10 = 2.43759E−10

Twenty-fourth surface

K = 0.00000E+00, A4 = 9.65097E−04, A6 = −9.88726E−06,
A8 = 6.27166E−08 A10 = 1.10268E−10

Twenty-fifth surface

K = 0.00000E+00, A4 = 4.46752E−04, A6 = −5.67440E−06,
A8 = −5.08062E−09 A10 = 4.55234E−10

[VARIOUS DATA IN INFINITY FOCUSING STATE]
[LIST 6A: VARIOUS DATA]
Zoom ratio 13.88428

| | Wide angle | Middle | Telephoto |
|---|---|---|---|
| Focal length | 9.0017 | 33.5403 | 124.9822 |
| F number | 3.41979 | 5.11297 | 6.62962 |
| Angle of view | 40.8791 | 13.1238 | 3.5766 |
| Image height | 6.6000 | 7.8000 | 7.4000 |
| Total lens length | 71.2403 | 84.1787 | 107.9961 |
| BF | 0.00971 | 0.06689 | 0.00395 |
| d5 | 0.5000 | 15.8269 | 36.8728 |
| d11 | 23.5338 | 7.5997 | 1.0000 |
| d19 | 2.7215 | 6.8025 | 5.0647 |
| d21 | 8.0263 | 19.4219 | 32.4231 |
| d23 | 4.8174 | 2.8292 | 1.0000 |
| Entrance pupil position | 15.7225 | 43.4496 | 156.6855 |
| Exit pupil position | −34.9345 | −101.5159 | −768.3912 |
| Front principal point position | 22.4053 | 65.9156 | 261.3389 |
| Rear principal point position | 62.2386 | 50.6383 | −16.9860 |

[LIST 6B: SINGLE LENS DATA]

| Lens | First surface | Focal length |
|---|---|---|
| 1 | 1 | −85.0365 |
| 2 | 2 | 64.1978 |
| 3 | 4 | 79.9334 |
| 4 | 6 | −11.6934 |
| 5 | 8 | −18.8069 |
| 6 | 10 | 22.9184 |
| 7 | 13 | 24.9134 |
| 8 | 15 | 13.6213 |
| 9 | 16 | −9.3859 |
| 10 | 18 | 16.3297 |
| 11 | 20 | −24.6355 |
| 12 | 22 | 26.7404 |
| 13 | 24 | −67.5571 |

[LIST 6C: ZOOM LENS GROUP DATA]

| Group | First surface | Focal length | Lens configuration length | Front principal point position | Rear principal point position |
|---|---|---|---|---|---|
| 1 | 1 | 61.98287 | 6.89000 | 1.56620 | 4.13710 |
| 2 | 6 | −10.64241 | 7.65720 | 0.45037 | 1.69002 |
| 3 | 12 | 13.75483 | 8.86440 | 1.51247 | 3.67233 |
| 4 | 20 | −24.63547 | 0.60000 | 0.62661 | 0.88051 |
| 5 | 22 | 26.74037 | 2.64000 | 1.96757 | 2.90593 |
| 6 | 24 | −67.55714 | 2.80000 | −2.57806 | −1.80992 |

[LIST 6D: ZOOM LENS GROUP MAGNIFICATION]

| Group | First surface | Wide angle | Middle | Telephoto |
|---|---|---|---|---|
| 1 | 1 | 0.00000 | 0.00000 | 0.00000 |
| 2 | 6 | −0.22341 | −0.32938 | −0.94478 |
| 3 | 12 | −0.45428 | −0.88900 | −0.89190 |
| 4 | 20 | 1.87024 | 2.18519 | 2.59427 |
| 5 | 22 | 0.69517 | 0.76776 | 0.83811 |
| 6 | 24 | 1.10065 | 1.10150 | 1.10056 |

Numerical Implementation Example 3

The imaging optical system according to Numerical implementation example 3 corresponds to Embodiment 3 illustrated in FIG. 7. The surface data of the imaging optical system of Numerical implementation example 3 is indicated in List 7, the aspheric surface data in List 8, and the various data in the infinity focusing state in List 9A to List 9D.

[LIST 7: SURFACE DATA]

| Surface number | r | d | nd | vd |
|---|---|---|---|---|
| Object surface | ∞ | | | |
| 1 | 77.83500 | 0.75000 | 1.90117 | 28.3 |
| 2 | 38.97590 | 3.32000 | 1.59322 | 63.4 |
| 3 | −1180.98660 | 0.15000 | | |
| 4 | 37.78270 | 2.67000 | 1.59354 | 63.4 |
| 5 | 178.92950 | Variable | | |
| 6* | 5062.75990 | 0.70000 | 1.84685 | 41.2 |
| 7* | 10.22200 | 4.34430 | | |
| 8 | −17.79240 | 0.50000 | 1.77186 | 45.9 |
| 9 | 56.40060 | 0.15420 | | |
| 10 | 29.38310 | 1.74000 | 1.94595 | 18.0 |
| 11 | −71.82840 | Variable | | |
| 12 (diaphragm) | ∞ | 1.00000 | | |
| 13* | 12.64820 | 1.61000 | 1.85343 | 40.5 |
| 14* | 28.70590 | 0.25000 | | |
| 15 | 8.05230 | 3.03000 | 1.49700 | 81.6 |
| 16 | −34.82220 | 0.50000 | 1.80691 | 34.3 |
| 17 | 9.64050 | 0.79810 | | |
| 18* | 16.02510 | 1.71000 | 1.55266 | 69.3 |
| 19* | −21.43470 | Variable | | |
| 20* | 24.25490 | 0.60000 | 1.77010 | 49.8 |
| 21* | 10.75530 | Variable | | |
| 22* | −98.76370 | 2.64000 | 1.53380 | 55.6 |
| 23* | −13.60120 | Variable | | |
| 24* | −10.15890 | 1.75000 | 1.53380 | 55.6 |
| 25* | −13.90320 | 0.15000 | | |
| 26 | ∞ | 0.90000 | 1.51680 | 64.2 |
| 27 | ∞ | 2.18000 | | |
| 28 | ∞ | BF | | |
| Image surface | ∞ | | | |

[LIST 8: ASPHERIC SURFACE DATA]

Sixth surface

K = 0.00000E+00, A4 = −1.66530E−05, A6 = 1.02835E−06, A8 = −1.17296E−08 A10 = 3.88611E−11

Seventh surface

K = −6.84288E−01, A4 = 5.28234E−05, A6 = 3.91720E−07, A8 = 5.53385E−08 A10 = −6.33609E−10

Thirteenth surface

K = 0.00000E+00, A4 = 1.61555E−04, A6 = 2.56405E−06, A8 = −3.36077E−08 A10 = 9.06802E−10

Fourteenth surface

K = 0.00000E+00, A4 = 2.06339E−04, A6 = 2.06506E−06, A8 = −6.46020E−08 A10 = 6.52851E−10

Eighteenth surface

K = 0.00000E+00, A4 = −1.20135E−07, A6 = −5.13709E−10, A8 = −2.83326E−11 A10 = −5.50409E−12

Nineteenth surface

K = 0.00000E+00, A4 = 2.92914E−04, A6 = 5.17412E−06, A8 = 8.15855E−08 A10 = 4.67697E−09

Twentieth surface

K = 0.00000E+00, A4 = −6.22338E−04, A6 = 3.53523E05, A8 = −8.53657E−07 A10 = 3.74814E−09

Twenty-first surface

K = 0.00000E+00, A4 = −7.00283E−04, A6 = 3.94650E−05, A8 = −1.05220E−06 A10 = 7.66896E−09

Twenty-second surface

K = 0.00000E+00, A4 = −2.32553E−04, A6 = −3.55833E−06, A8 = 1.82283E−08 A10 = 3.54405E−10

Twenty-third surface

K = −5.52315E−01, A4 = −1.81199E−05, A6 = −3.60568E−06, A8 = 1.98546E−08 A10 = 2.73953E−10

Twenty-fourth surface

K = 0.00000E+00, A4 = 9.76457E−04, A6 = −9.93322E−06, A8 = 6.34609E−08 A10 = 1.46443E−10

Twenty-fifth surface

K = 0.00000E+00, A4 = 4.77887E−04, A6 = −5.33137E−06, A8 = −6.82304E−09 A10 = 4.27275E−10

[VARIOUS DATA IN INFINITY FOCUSING STATE]
[LIST 9A: VARIOUS DATA]
Zoom ratio 14.73229

| | Wide angle | Middle | Telephoto |
|---|---|---|---|
| Focal length | 9.5016 | 36.4339 | 139.9810 |
| F number | 3.42003 | 5.36127 | 6.63016 |
| Angle of view | 39.7843 | 12.3029 | 3.2276 |
| Image height | 6.7000 | 7.9000 | 7.5000 |
| Total lens length | 72.9673 | 86.5746 | 108.2545 |
| BF | 0.01517 | 0.08144 | 0.00071 |
| d5 | 0.5000 | 16.3595 | 37.1796 |
| d11 | 24.0549 | 8.0898 | 1.0000 |
| d19 | 2.7695 | 7.5849 | 4.9492 |
| d21 | 8.6490 | 19.9427 | 32.6349 |
| d23 | 5.5321 | 3.0697 | 1.0435 |
| Entrance pupil position | 15.9372 | 46.1397 | 171.4911 |
| Exit pupil position | −37.8861 | −110.4138 | −730.3713 |
| Front principal point position | 23.0568 | 70.5602 | 284.6437 |
| Rear principal point position | 63.4656 | 50.1407 | −31.7265 |

[LIST 9B: SINGLE LENS DATA]

| Lens | First surface | Focal length |
|---|---|---|
| 1 | 1 | −87.4304 |
| 2 | 2 | 63.6672 |
| 3 | 4 | 80.1318 |
| 4 | 6 | −12.0958 |
| 5 | 8 | −17.4720 |
| 6 | 10 | 22.2301 |
| 7 | 13 | 25.3250 |
| 8 | 15 | 13.4752 |
| 9 | 16 | −9.3102 |
| 10 | 18 | 16.8660 |
| 11 | 20 | −25.5879 |
| 12 | 22 | 29.2338 |
| 13 | 24 | −84.3934 |

[LIST 9C: ZOOM LENS GROUP DATA]

| Group | First surface | Focal length | Lens configuration length | Front principal point position | Rear principal point position |
|---|---|---|---|---|---|
| 1 | 1 | 60.42057 | 6.89000 | 1.53755 | 4.11249 |
| 2 | 6 | −10.54452 | 7.43850 | 0.57541 | 1.88542 |
| 3 | 12 | 14.13323 | 8.89810 | 1.43273 | 3.60225 |
| 4 | 20 | −25.58786 | 0.60000 | 0.62103 | 0.87538 |
| 5 | 22 | 29.23382 | 2.64000 | 1.97480 | 2.91196 |
| 6 | 24 | −84.39337 | 2.80000 | −3.69694 | −3.00289 |

[LIST 9D: ZOOM LENS GROUP MAGNIFICATION]

| Group | First surface | Wide angle | Middle | Telephoto |
|---|---|---|---|---|
| 1 | 1 | 0.00000 | 0.00000 | 0.00000 |
| 2 | 6 | −0.22911 | −0.34958 | −1.12854 |
| 3 | 12 | −0.47319 | −0.93147 | −0.86723 |

-continued

| | | | | |
|---|---|---|---|---|
| 4 | 20 | 1.90198 | 2.16999 | 2.54253 |
| 5 | 22 | 0.69662 | 0.77896 | 0.85058 |
| 6 | 24 | 1.09477 | 1.09556 | 1.09460 |

Numerical Implementation Example 4

The imaging optical system according to Numerical implementation example 4 corresponds to Embodiment 4 illustrated in FIG. 10. The surface data of the imaging optical system of Numerical implementation example 4 is indicated in List 10, the aspheric surface data in List 11, and the various data in the infinity focusing state in List 12A to List 12D.

[LIST 10: SURFACE DATA]
SURFACE DATA

| Surface number | r | d | nd | vd |
|---|---|---|---|---|
| Object surface | ∞ | | | |
| 1 | 73.15840 | 1.05770 | 1.90366 | 31.3 |
| 2 | 38.56220 | 4.27170 | 1.59282 | 68.6 |
| 3 | 14342.09940 | 0.15000 | | |
| 4 | 38.18270 | 3.15090 | 1.59282 | 68.6 |
| 5 | 165.54930 | Variable | | |
| 6* | −174.30820 | 0.70000 | 1.80998 | 40.9 |
| 7* | 9.40530 | 4.70240 | | |
| 8 | −25.72340 | 0.50000 | 1.83400 | 37.3 |
| 9 | 66.99810 | 0.16640 | | |
| 10 | 25.52910 | 2.00000 | 1.94595 | 18.0 |
| 11 | −98.01450 | Variable | | |
| 12 (diaphragm) | ∞ | 1.00000 | | |
| 13* | 11.96340 | 2.01630 | 1.80998 | 40.9 |
| 14* | 28.01790 | 1.47190 | | |
| 15 | 204.17350 | 2.60880 | 1.49700 | 81.6 |
| 16 | −6.81790 | 0.30000 | 1.80610 | 33.3 |
| 17 | −20.25830 | 1.07940 | | |
| 18* | −21.31630 | 1.51870 | 1.55332 | 71.7 |
| 19* | −9.20340 | Variable | | |
| 20* | 19.77290 | 0.60000 | 1.77010 | 49.8 |
| 21* | 10.75940 | Variable | | |
| 22* | −54.26150 | 3.80790 | 1.53380 | 55.6 |
| 23* | −10.65900 | Variable | | |
| 24* | −10.63080 | 1.76160 | 1.53380 | 55.6 |
| 25* | −25.33380 | 0.15000 | | |
| 26 | ∞ | 0.90000 | 1.51680 | 64.2 |
| 27 | ∞ | 2.18000 | | |
| 28 | ∞ | BF | | |
| Image surface | ∞ | | | |

[LIST 11: ASPHERIC SURFACE DATA]

Sixth surface

K = 0.00000E+00, A4 = 6.51393E−06, A6 = 5.14509E−07,
A8 = −6.86804E−09 A10 = 2.42463E−11
Seventh surface K = −5.71429E−01, A4 = 5.21358E−05, A6 = 3.72183E−07,
A8 = 3.76208E−08 A10 = −4.69665E−10
Thirteenth surface K = 0.00000E+00, A4 = 1.82787E−04, A6 = 3.97436E−06,
A8 = 1.30281E−08 A10 = 4.07741E−09
Fourteenth surface K = 0.00000E+00, A4 = 2.79661E−04, A6 = 4.22249E−06,
A8 = 2.31159E−08 A10 = 5.66638E−09
Eighteenth surface K = 0.00000E+00, A4 = −2.35915E−05, A6 = −7.16537E−07,
A8 = −1.91199E−08 A10 = −5.37923E−09
Nineteenth surface K = 0.00000E+00, A4 = 1.13243E−04, A6 = 7.12985E−08,
A8 = −1.26835E−08 A10 = −3.29054E−09
Twentieth surface K = 0.00000E+00, A4 = −6.64275E−04, A6 = 3.05738E−05,
A8 = −9.60485E−07 A10 = 1.84753E−08
Twenty-first surface K = 0.00000E+00, A4 = −7.61401E−04, A6 = 3.41358E−05,
A8 = −1.09105E−06 A10 = 2.15502E−08
Twenty-second surface K = 0.00000E+00, A4 = −2.29250E−04, A6 = −1.16816E−06,
A8 = 6.63863E−08 A10 = −3.57365E−10
Twenty-third surface K = −8.23433E−01, A4 = 3.71099E−06, A6 = 4.80031E−08,
A8 = 2.50297E−08 A10 = −1.02852E−10
Twenty-fourth surface K = 0.00000E+00, A4 = 1.07790E−03, A6 = −8.13128E−06,
A8 = 6.39057E−08 A10 = −2.54883E−10
Twenty-fifth surface K = 0.00000E+00, A4 = 6.00693E−04, A6 = −5.44287E−06,
A8 = 1.14595E−08 A10 = −8.48471E−11

[VARIOUS DATA IN INFINITY FOCUSING STATE]
[LIST 12A: VARIOUS DATA]
Zoom ratio 13.32889

| | Wide angle | Middle | Telephoto |
|---|---|---|---|
| Focal length | 8.9996 | 32.7549 | 119.9549 |
| F number | 41.2186 | 5.13081 | 6.63113 |
| Angle of view | 39.7843 | 13.5146 | 3.7437 |
| Image height | 6.9000 | 7.8000 | 7.4000 |
| Total lens length | 80.0193 | 91.5512 | 117.3280 |
| BF | 0.02848 | 0.02079 | −0.00214 |
| d5 | 0.7669 | 17.2917 | 37.3441 |
| d11 | 26.0974 | 7.6014 | 1.0000 |
| d19 | 5.1117 | 7.9921 | 2.5908 |
| d21 | 7.3902 | 19.1248 | 38.2741 |
| d23 | 4.5309 | 3.4267 | 2.0274 |
| Entrance pupil position | 18.1808 | 50.6733 | 175.1735 |
| Exit pupil position | −34.1471 | −68.2543 | −172.9190 |
| Front principal point position | 24.8105 | 67.7141 | 211.9140 |
| Rear principal point position | 71.0197 | 58.7963 | −2.6269 |

[LIST 12B: [SINGLE LENS DATA]

| Lens | First surface | Focal length |
|---|---|---|
| 1 | 1 | −91.5677 |
| 2 | 2 | 65.2164 |
| 3 | 4 | 82.9530 |
| 4 | 6 | −10.9986 |
| 5 | 8 | −22.2321 |
| 6 | 10 | 21.5810 |
| 7 | 13 | 24.4046 |
| 8 | 15 | 13.3296 |
| 9 | 16 | −12.8766 |
| 10 | 18 | 28.0195 |
| 11 | 20 | −31.5632 |
| 12 | 22 | 24.1165 |
| 13 | 24 | −35.8078 |

[LIST 12C: ZOOM LENS GROUP DATA]

| Group | First surface | Focal length | Lens configuration length | Front principal point position | Rear principal point position |
|---|---|---|---|---|---|
| 1 | 1 | 61.87849 | 8.63030 | 1.81054 | 5.05314 |
| 2 | 6 | −11.79051 | 8.06880 | −0.09369 | 1.04588 |
| 3 | 12 | 15.86902 | 9.99510 | 4.55868 | 5.66921 |

| | | | | | |
|---|---|---|---|---|---|
| 4 | 20 | −31.56320 | 0.60000 | 0.76576 | 1.01669 |
| 5 | 22 | 24.11645 | 3.80790 | 2.99843 | 4.39690 |
| 6 | 24 | −35.80780 | 2.81160 | −0.86655 | 0.00320 |

[LIST 12D: ZOOM LENS GROUP MAGNIFICATION]

| Group | First surface | Wide angle | Middle | Telephoto |
|---|---|---|---|---|
| 1 | 1 | 0.00000 | 0.00000 | 0.00000 |
| 2 | 6 | 0.25722 | −0.40223 | −1.27322 |
| 3 | 12 | −0.43319 | −0.79957 | −0.67485 |
| 4 | 20 | 1.65919 | 1.96172 | 2.49168 |
| 5 | 22 | 0.69002 | 0.73605 | 0.79480 |
| 6 | 24 | 1.14011 | 1.13989 | 1.13925 |

Numerical Implementation Example 5

Figure 13:
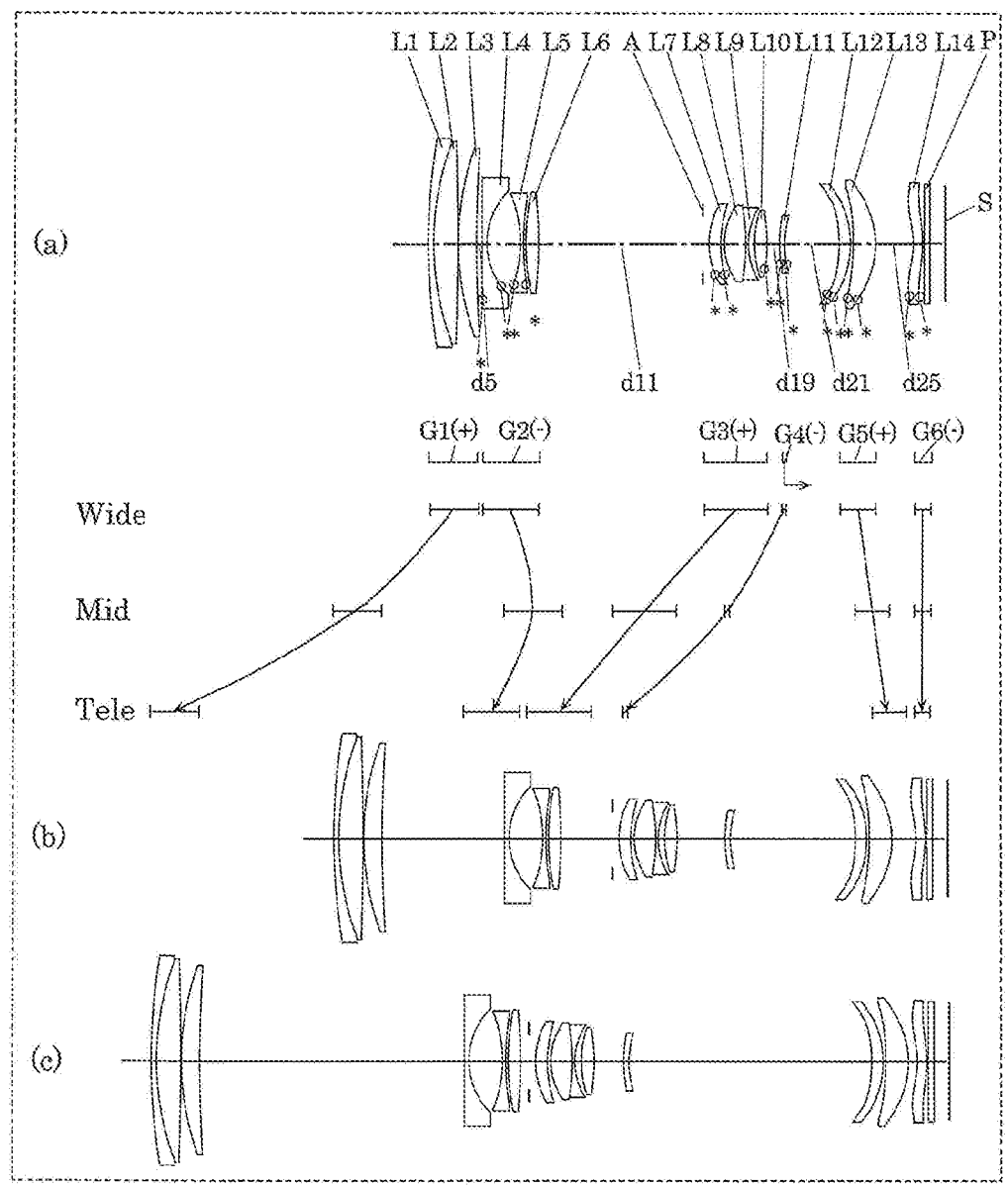
FIG. 13 is a lens arrangement diagram illustrating an infinity focusing state of an imaging optical system according to Embodiment 5 (Numerical Implementation Example 5)

The imaging optical system according to Numerical implementation example 5 corresponds to Embodiment 5 illustrated in FIG. 13. The surface data of the imaging optical system of Numerical implementation example 5 is indicated in List 13, the aspheric surface data in List 14, and the various data in the infinity focusing state in List 15A to List 15D.

[LIST 13: SURFACE DATA]
SURFACE DATA

| Surface number | r | d | nd | vd |
|---|---|---|---|---|
| Object surface | ∞ | | | |
| 1 | 99.28220 | 0.75080 | 1.90366 | 31.3 |
| 2 | 43.74470 | 3.44600 | 1.59282 | 68.6 |
| 3 | −274.93770 | 0.15000 | | |
| 4 | 38.27760 | 2.53100 | 1.59201 | 67.0 |
| 5 | 157.98190 | Variable | | |
| 6* | −741.63460 | 0.74670 | 1.82080 | 42.7 |
| 7* | 10.55760 | 4.77970 | | |
| 8* | −17.65730 | 0.51100 | 1.80139 | 45.4 |
| 9* | 62.73420 | 0.17880 | | |
| 10 | 33.43230 | 1.85760 | 1.94595 | 18.0 |
| 11 | −57.54740 | Variable | | |
| 12 (diaphragm) | ∞ | 1.00000 | | |
| 13* | 12.84790 | 1.72310 | 1.85343 | 40.5 |
| 14* | 29.19430 | 0.25000 | | |
| 15 | 8.11310 | 3.08920 | 1.49700 | 81.6 |
| 16 | −34.78580 | 0.50230 | 1.80610 | 33.3 |
| 17 | 9.78940 | 0.88670 | | |
| 18 | 14.79880 | 1.75620 | 1.55332 | 71.7 |
| 19* | −22.81520 | Variable | | |
| 20* | 25.79860 | 0.62080 | 1.77010 | 49.8 |
| 21* | 10.87190 | Variable | | |
| 22* | −31.23830 | 1.60360 | 1.53380 | 55.6 |
| 23* | −14.26280 | 0.32210 | | |
| 24* | −36.08110 | 3.08690 | 1.51760 | 63.5 |
| 25* | −14.29030 | Variable | | |
| 26* | −10.31360 | 1.19750 | 1.53380 | 55.6 |
| 27* | −20.73330 | 0.15000 | | |
| 28 | ∞ | 0.90000 | 1.51680 | 64.2 |
| 29 | ∞ | 2.18000 | | |
| 30 | ∞ | BF | | |
| Image surface | ∞ | | | |

[LIST 14: ASPHERIC SURFACE DATA]

Sixth surface

K = 0.00000E+00, A4 = −2.57973E−06, A6 = 8.91866E−07, A8 = −1.00448E−08 A10 = 3.23802E−11
Seventh surface K = −6.58868E−01, A4 = 5.38049E−05, A6 = 4.76256E−07, A8 = 4.24774E−08 A10 = −4.18304E−10
Eighth surface K = 0.00000E+00, A4 = 1.46413E−06, A6 = −8.88943E−09, A8 = 7.84850E−10 A10 = 1.50188E−11
Ninth surface K = 0.00000E+00, A4 = −5.79102E−07, A6 = 2.38073E−08, A8 = 4.92385E−11 A10 = 4.25699E−12
Thirteenth surface K = 0.00000E+00, A4 = 1.54376E−04, A6 = 2.16123E−06, A8 = −3.89984E−08 A10 = 1.21062E−09
Fourteenth surface K = 0.00000E+00, A4 = 1.97550E−04, A6 = 1.58748E−06, A8 = −6.77439E−08 A10 = 1.24389E−09
Nineteenth surface K = 0.00000E+00, A4 = 3.08457E−04, A6 = 5.04205E−06, A8 = 6.65733E−08 A10 = 3.49950E−09
Twentieth surface K = 0.00000E+00, A4 = −5.99380E−04, A6 = 3.36483E−05, A8 = −9.27782E−07 A10 = 1.07208E−08
Twenty-first surface K = 0.00000E+00, A4 = −6.79673E−04, A6 = 3.74781E−05, A8 = −1.11626E−06 A10 = 1.50347E−08
Twenty-second surface K = 0.00000E+00, A4 = −3.08934E−04, A6 = −2.94552E−06, A8 = 4.39659E−08 A10 = 3.43312E−11
Twenty-third surface K = −3.03213E−01, A4 = −7.62421E−05, A6 = −1.36649E−06, A8 = 1.12243E−08 A10 = 1.43283E−10
Twenty-fourth surface K = 0.00000E+00, A4 = 8.21707E−07, A6 = 7.15237E−09, A8 = 4.27519E−12 A10 = −2.13766E−13
Twenty-fifth surface K = 0.00000E+00, A4 = −5.92655E−07, A6 = 1.61997E−09, A8 = 9.03453E−11 A10 = 1.39774E−12
Twenty-sixth surface K = 0.00000E+00, A4 = 1.09675E−03, A6 = −8.07165E−06, A8 = 6.71826E−08 A10 = −3.16780E−10
Twenty-seventh surface K = 0.00000E+00, A4 = 3.66170E−04, A6 = −4.75661E−07, A8 = 1.76137E−08 A10 = −3.78046E−10

[VARIOUS DATA IN INFINITY FOCUSING STATE]
[LIST 15A: VARIOUS DATA]
Zoom ratio 14.62796

| | Wide angle | Middle | Telephoto |
|---|---|---|---|
| Focal length | 8.9844 | 34.2679 | 131.4231 |
| F number | 3.40823 | 4.75138 | 6.59169 |
| Angle of view | 41.2940 | 12.9652 | 3.4630 |
| Image height | 6.7000 | 7.9000 | 7.5000 |
| Total lens length | 73.6626 | 87.3579 | 113.5239 |
| BF | −0.12870 | −0.12147 | −0.14851 |
| d5 | 0.7399 | 17.5265 | 37.7219 |
| d11 | 23.5048 | 7.3413 | 1.0629 |
| d19 | 1.9920 | 6.9485 | 4.5764 |
| d21 | 7.7784 | 17.9238 | 34.8204 |
| d25 | 5.5562 | 3.5193 | 1.2708 |
| Entrance pupil position | 16.3222 | 48.0516 | 161.8223 |
| Exit pupil position | −31.2472 | −70.6831 | −270.5028 |
| Front principal point position | 22.7126 | 65.6775 | 229.3587 |
| Rear principal point position | 64.6782 | 53.0900 | −17.8992 |

-continued

[LIST 15B: SINGLE LENS DATA]

| Lens | First surface | Focal length |
|---|---|---|
| 1 | 1 | −87.0968 |
| 2 | 2 | 63.9186 |
| 3 | 4 | 84.6660 |
| 4 | 6 | −12.6764 |
| 5 | 8 | −17.1455 |
| 6 | 10 | 22.5795 |
| 7 | 13 | 25.6424 |
| 8 | 15 | 13.5612 |
| 9 | 16 | −9.4297 |
| 10 | 18 | 16.4972 |
| 11 | 20 | −24.8497 |
| 12 | 22 | 47.6037 |
| 13 | 24 | 43.6076 |
| 14 | 26 | −40.0471 |

[LIST 15C: ZOOM LENS GROUP DATA]

| Group | First surface | Focal length | Lens configuration length | Front principal point position | Rear principal point position |
|---|---|---|---|---|---|
| 1 | 1 | 62.91170 | 6.87780 | 1.81400 | 4.38774 |
| 2 | 6 | −10.75672 | 8.07380 | 0.67541 | 2.05697 |
| 3 | 12 | 13.98388 | 9.20750 | 1.63793 | 3.81041 |
| 4 | 20 | −24.84968 | 0.62080 | 0.61733 | 0.88095 |
| 5 | 22 | 23.44920 | 5.01260 | 3.30619 | 4.96274 |
| 6 | 24 | −40.04708 | 2.24750 | −0.80499 | −0.11411 |

[LIST 15D: ZOOM LENS GROUP MAGNIFICATION]

| Group | First surface | Wide angle | Middle | Telephoto |
|---|---|---|---|---|
| 1 | 1 | 0.00000 | 0.00000 | 0.00000 |
| 2 | 6 | −0.22294 | −0.34188 | −0.95466 |
| 3 | 12 | −0.46105 | −0.90531 | −0.88733 |
| 4 | 20 | 1.99998 | 2.22490 | 2.74634 |
| 5 | 22 | 0.62575 | 0.71236 | 0.80918 |
| 6 | 26 | 1.11019 | 1.11037 | 1.10970 |

Values Corresponding to Conditions

Values corresponding to condition (1) to condition (4) are shown in Table 1 below.

TABLE 1

|  | Embodiment 1 | Embodiment 2 | Embodiment 3 | Embodiment 4 | Embodiment 5 |
|---|---|---|---|---|---|
| (1) | 4.54 | 4.23 | 4.93 | 4.95 | 4.28 |
| (2) | 1.41 | 1.39 | 1.34 | 1.50 | 1.37 |
| (3) | 0.81 | 0.86 | 0.77 | 0.98 | 0.86 |
| (4) | 14.44 | 13.88 | 14.73 | 13.33 | 14.63 |

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

An imaging optical system according to the present disclosure is applicable to a digital still camera, an interchangeable lens digital camera, a digital video camera, a camera in a cellular phone, a camera in a personal digital assistant (PDA), a monitoring camera in a monitoring system, a Web camera, a vehicle mounted camera, etc., and is particularly suited to an imaging optical system for which high image quality is required, such as in a digital still camera system and a digital video camera system.

What is claimed is:

1. A zoom lens system, comprising, in order from an object side to an image side:
   a first lens group having positive power;
   a second lens group having negative power;
   a third lens group having positive power;
   a fourth lens group having negative power;
   a fifth lens group having positive power; and
   a sixth lens group having negative power, wherein
   during zooming from a wide angle extremity to a telephoto extremity, distances between lens groups change,
   the fifth lens group includes at most two lens elements, at least one of which is a meniscus lens having a concave surface on the object side, and
   the following condition (4) is satisfied:

$$10.2 < fT/fW \quad (4)$$

where:
   fT denotes a focal length at the telephoto extremity; and
   fW denotes a focal length at the wide angle extremity.

2. The zoom lens system according to claim 1, wherein during the zooming from the wide angle extremity to the telephoto extremity:
   at least the first lens group moves along an optical axis of the zoom lens system; and
   a distance between the first lens group and the second lens group at the telephoto extremity is greater than a distance between the first lens group and the second lens group at the wide angle extremity.

3. The zoom lens system according to claim 1, wherein the following condition (1) is satisfied:

$$3.8 < |\beta 2T/\beta 2W| < 7.0 \quad (1)$$

where:
   β2T denotes a lateral magnification of the second lens group at the telephoto extremity; and
   β2W denotes a lateral magnification of the second lens group at the wide angle extremity.

4. The zoom lens system according to claim 1, wherein the following condition (2) is satisfied:

$$1.2 < |\beta 4T/\beta 4W| < 4.0 \quad (2)$$

where:
   β4T denotes a lateral magnification of the fourth lens group at the telephoto extremity; and
   β4W denotes a lateral magnification of the fourth lens group at the wide angle extremity.

5. The zoom lens system according to claim 1, wherein the following condition (3) is satisfied:

$$LT/fT < 1.08 \quad (3)$$

where:
   LT denotes a total optical length at the telephoto extremity; and
   fT denotes a focal length at the telephoto extremity.

6. The zoom lens system according to claim 1, wherein the fourth lens group includes one lens element.

7. The zoom lens system according to claim 1, wherein during image blur correction, an entirety or a part of the third lens group moves relative to an optical axis of the zoom lens system while maintaining a component in a perpendicular direction.

8. The zoom lens system according to claim 1, wherein the third lens group includes a diaphragm.

9. An imaging device configured to output an optical image of an object as an electrical image signal, the imaging device comprising:
- a zoom lens system configured to form the optical image of the object; and
- an imaging element configured to convert the optical image formed by the zoom lens system into the electrical image signal, wherein the zoom lens system includes, in order from an object side to an image side:
- a first lens group having positive power;
- a second lens group having negative power;
- a third lens group having positive power;
- a fourth lens group having negative power;
- a fifth lens group having positive power; and
- a sixth lens group having negative power, wherein during zooming from a wide angle extremity to a telephoto extremity, distances between lens groups change, the fifth lens group includes at most two lens elements, at least one of which is a meniscus lens element having a concave surface on the object side, and the following condition (4) is satisfied:

$$10.2 < fT/fW \quad (4)$$

where:
- fT denotes a focal length at the telephoto extremity; and
- fW denotes a focal length at the wide angle extremity.

\* \* \* \* \*